US008996625B1

(12) United States Patent  (10) Patent No.: US 8,996,625 B1
Singleton et al.  (45) Date of Patent: Mar. 31, 2015

(54) AGGREGATE DISPLAY OF MESSAGES

(75) Inventors: David P. Singleton, London (GB); Scott Eblen, London (GB)

(73) Assignee: Google Inc., Mountain View, CA (US)

( * ) Notice: Subject to any disclaimer, the term of this patent is extended or adjusted under 35 U.S.C. 154(b) by 271 days.

(21) Appl. No.: 13/018,852

(22) Filed: Feb. 1, 2011

(51) Int. Cl.
  *G06F 15/16* (2006.01)
  *H04L 29/06* (2006.01)

(52) U.S. Cl.
  CPC ...................................... *H04L 29/06* (2013.01)
  USPC .......................................... 709/206; 707/771

(58) Field of Classification Search
  CPC ............. G06F 17/00; G06F 17/30489; G06F 17/3089; G06F 3/048; H04L 65/403
  USPC .......................................................... 709/206
  See application file for complete search history.

(56) References Cited

U.S. PATENT DOCUMENTS

| | | | | |
|---|---|---|---|---|
| 8,229,910 | B2 * | 7/2012 | Jania et al. | 707/706 |
| 8,239,499 | B2 * | 8/2012 | Kwon | 709/220 |
| 8,326,880 | B2 * | 12/2012 | Carson et al. | 707/791 |
| 2008/0250337 | A1 | 10/2008 | Lemmela et al. | 715/764 |
| 2009/0019085 | A1 * | 1/2009 | Abhyanker | 707/104.1 |
| 2010/0023506 | A1 * | 1/2010 | Sahni et al. | 707/5 |
| 2012/0005224 | A1 * | 1/2012 | Ahrens et al. | 707/769 |
| 2014/0068457 | A1 * | 3/2014 | Lindsay et al. | 715/751 |

OTHER PUBLICATIONS

Agrawal, Harsh. "Facebook Redesigned Shared Feed Link Stories." Calling All Geeks, Jul. 26, 2010 [Retreived on Mar. 1, 2011]. Retrieved from the Internet <URL: http://www.callingallgeeks.org/facebook-redesigned-shared-feed-link-stories/> (6 pages).
Google. Screenshot of Google Buzz product publicly available before Feb. 1, 2011. (1 page).
Lifehacker. "Google Buzz Explained." [Retreived on Aug. 25, 2010]. Retrieved from the Internet <URL: http://lifehacker.com/5467841/google-buzz-explained> (4 pages).

(Continued)

*Primary Examiner* — Jonathan C Teixeira Moffat
*Assistant Examiner* — Eyob Hagos
(74) *Attorney, Agent, or Firm* — Morgan, Lewis & Bockius LLP

(57) ABSTRACT

In general, the subject matter described in this specification can be embodied in methods, systems, and program products for aggregating posts submitted to a messaging system. A server system identifies a plurality of posts that were submitted to a messaging system from a plurality of users with which a first user has an acquaintanceship relationship. The server system analyzes content from a body of each post to determine a group of the posts that each reference a common topic. The server system provides information so as to cause the computing device to display to the first user, in place of an individual display for each post in the group, an aggregate post that presents, as a primary entity, a second user of the messaging system that is affiliated with the common topic and that did not submit to the messaging system a post that referenced the common topic.

19 Claims, 10 Drawing Sheets

(56) References Cited

OTHER PUBLICATIONS

Microsoft Outlook 2010: The official blog of the Microsoft Outlook product team. "What's up with my Inbox in Outlook 2010?!" Jul. 20, 2009 [Retrieved on Aug. 26, 2010]. Retrieved from the Internet <URL: http://blogs.office.com/b/microsoft-outlook/archive/2009/07/20/what-s-up-with-my-inbox-in-outlook-2010.aspx> (3 pages).

Wikipedia. "URL Shortening." [Retrieved on Aug. 17, 2010]. Retrieved from the Internet <URL: http://en.wikipedia.org/w/index.php?title=URL_shortening&printable=yes> (5 pages).

* cited by examiner

AGGREGATE DISPLAY OF MESSAGES

TECHNICAL FIELD

This document generally relates to messaging services.

BACKGROUND

Some social networks allow individuals to submit posts without identifying recipient users that should receive the posts. Instead, the social network distributes the posts to users that subscribe to the authors of the posts. Thus, a social network user may view a content stream of posts that have been authored by other users (which may be people, aliases or pen names, or organizations) to which the user subscribes. The posts in the content stream may be arranged chronologically or based on determined relevance to the viewing user.

The posts that are transmitted via the social network may be entirely textual, or may include multimedia content (e.g., images or videos). In some instances, the posts may include a Universal Resource Locator (URL), and such posts may be automatically populated with content that is selected from a website that is identified by the URL.

SUMMARY

This document describes techniques, methods, systems, and mechanisms for providing an aggregate display of messages. In general, a social networking system may receive, from multiple users, individual posts that each refer to a common topic and that the social networking system determines should be displayed to a particular user of the social network. Instead of displaying each of the posts separately to the particular user, the social networking system can generate an aggregate post for display to the particular user. The aggregate post may identify, as a primary entity, a user of the social network that is affiliated with the common topic, but that may not be an acquaintance of the particular user.

In some examples, an icon that visually indicates an author of the aggregate post may not show any of the authors of the individual posts. Instead, the identified author may be an entity that is associated with the common topic. In some examples, the aggregate post does not present all of the user-provided content from each of the posts. In some examples, the aggregate post visually identifies an indication of each author's opinion of the common topic. The opinion may be determined based on sentiment analysis of the post content. In some examples, the common topic is user-provided text that is included in a body of each of the posts. In some examples, the common topic is text that is not included in the body of each of the posts, but is included a webpage that is identified by a user-provided URL.

In general, one aspect of the subject matter described in this specification can be embodied in a computer-implemented method for aggregating posts that were submitted to a messaging system. The method includes identifying, by a server system, a plurality of posts that were submitted to a messaging system from a plurality of users with which a first user of the messaging system has an acquaintanceship relationship. The method includes analyzing, by the server system, content from a body of each post in the plurality to determine a group of the posts that each reference a common topic, the common topic referenced by a first subset of the content of each post in the group. The method includes providing information, by the server system and for receipt by a computing device, so as to cause the computing device to display to the first user, in place of an individual display for each post in the group, an aggregate post that presents, as a primary entity for the aggregate post, a second user of the messaging system that is affiliated with the common topic and that did not submit to the messaging system a post that referenced the common topic.

Another aspect of the subject matter described in this specification can be embodied in a computer-implemented method for displaying an aggregate of posts that were submitted to a messaging system. The method includes receiving, by a computing device and from a server system, information for causing a display of posts that were submitted to a messaging system. The method includes displaying, by the computing device and using the received information, in place of an individual display for each post in a group, an aggregate post that presents, as a primary entity for the aggregate post, a second user of the social network that is affiliated with a common topic and that did not submit to the messaging system a post that referenced the common topic, wherein the aggregate post is displayed in response to the server system: (i) identifying a plurality of posts that were submitted to the messaging system from a plurality of users with which a first user has an acquaintanceship relationship, (ii) analyzing content from a body of each post in the plurality to determine that the group of posts each reference the common topic, the common topic referenced by a first subset of the content of each post in the group, and (iii) providing the information to the computing device.

Additional aspects can optionally include one or more of the following features. The first user of the messaging system may not have an acquaintanceship relationship with the second user. The display of the aggregate post may include a graphical interface element that, when selected by the first user, causes the computing device to display a web page that is hosted by the messaging system for the second user and that displays content that the second user designated for display on the web page. The display of the aggregate post may include an image that the second user designated, using settings of the messaging system, as a primary image for the second user's account. The display of the aggregate post may be provided in a displayed feed of the plurality of posts. Remaining posts in the plurality that are not in the group of posts may be displayed as individual posts in the feed, each display of a particular remaining post of the remaining posts including an image that a user of the messaging system that authored the particular remaining post designated as a primary image for the user's account. The image that the second user designated as the primary image may have a displayed position within the aggregate post that is a same as a displayed position within each particular remaining post of the image that is designated as the primary image for the particular remaining post.

The display of the aggregate post may be provided in a displayed feed of the plurality of posts. Remaining posts in the plurality that are not in the group of posts may be displayed as individual posts in the feed, each display of a particular remaining post of the remaining posts including an image that a user of the messaging system that authored the particular remaining post designated as a primary image for the user's account. The image that the second user designated as the primary image may have a size that is a same as a size of each image that is designated as the primary image for each particular remaining post. The acquaintanceship relationship may have been formed between the first user and each particular user in the plurality in response to a user-provided request by the first user to form the acquaintanceship relationship with the particular user, and a user-provided acknowledgment by the particular user that the acquaintanceship relationship should be formed. The group of posts may be determined based on each of the posts in the group including a same Uniform Resource Identifier (URI).

The group of posts may be determined based on a subset of the posts in the group including a first Uniform Resource Locator (URL), and a remaining subset of the posts in the group including another URL that has been determined to cause a redirect to the first URL. The group of posts may be determined based on a subset of the posts in the group including predetermined text, and a remaining subset of the posts in the group including a Uniform Resource Locator (URL) that identifies a resource that includes the predetermined text, wherein each of the remaining subset of posts may not include the predetermined text. The feed may not include individual displays for each of the posts in the group. The display of the aggregate post may include graphical user interface elements that visually indicate the users that submitted the posts in the group. The group of posts may be determined based on the posts in the group including a first Uniform Resource Locator (URL), and wherein the display of the aggregate post may include content that was retrieved from a document identified by the first URL and that was not included in any of the posts in the group.

The method may include performing, on each particular post in the group, sentiment analysis using user-provided content in the particular post to identify an attitude of a user that submitted the particular post towards the common topic, wherein the display of the aggregate post may include a visual identification of the attitude for each user that submitted each particular post or a summary of the attitudes of each user that submitted each particular post. The group of posts may be determined based on each particular post in the group being submitted while an author of the particular post had designated a particular venue as a current geographical location. The particular user may provide user input to designate the particular venue as the current geographical location before submitting the post. The particular user may submit another post before the particular post without again providing user input to designate the particular venue as the current geographical location. The common topic may have been determined, without user intervention, as a topic for which aggregate posts may be generated based, at least in part, on the common topic being selected, without user intervention, as a frequent term in search queries that are provided to a search engine system.

Another aspect of the subject matter described in this specification can be embodied in a computer-implemented system. The system includes a computer-implemented post distributor that is programmed to identify, for a first user, a plurality of posts that were submitted to a messaging system from a plurality of users with which the first user has an acquaintanceship relationship. The system includes a computer-implemented common topic extractor that is programmed to analyze content from a body of each post in the plurality to determine a group of the posts that each reference a common topic, the common topic referenced by a first subset of the content of each post in the group. The system includes a computer-implemented post generator that is programmed to generate an aggregate post that is (i) based on the common topic and (ii) that is to identify, as a primary entity for the aggregate post, a second user of the messaging system that is affiliated with the common topic and that did not submit to the messaging system a post that referenced the common topic. The system includes a computer-implemented post communicator that is programmed to provide information that causes a visual display to the first user on a computing device of the aggregate post in place of an individual display for each post in the group.

Additional aspects can optionally include one or more of the following features. The information may cause a concurrent visual display of the aggregate post and other posts in the plurality that are not included in the first group. The common topic extractor may determine that a first post in the plurality should be excluded from the group of posts, even though the first post references the common topic, due to the first post having a determined relevance that exceeds a predetermined relevance score, so as to cause the post communicator to provide information that causes a concurrent visual display of the first post and the aggregate post.

Particular embodiments can be implemented, in certain instances, to realize one or more of the following advantages. Displaying an aggregate post in place of multiple individual posts may free up space in a content stream of posts so that the content stream may present additional posts that would not otherwise have appeared for display. Accordingly, a duplication of content in the stream may be reduced, and user interest in the social networking system may increase. An aggregate post may visually identify multiple users that each submitted a post referencing a common topic, and thus a viewing user may be able to discern that the multiple users have a similar interest. Visual identifications of the multiple users' opinions in a single aggregate post may provide a grouped display of users that have communicated regarding a topic, and the user's opinions on the topic.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
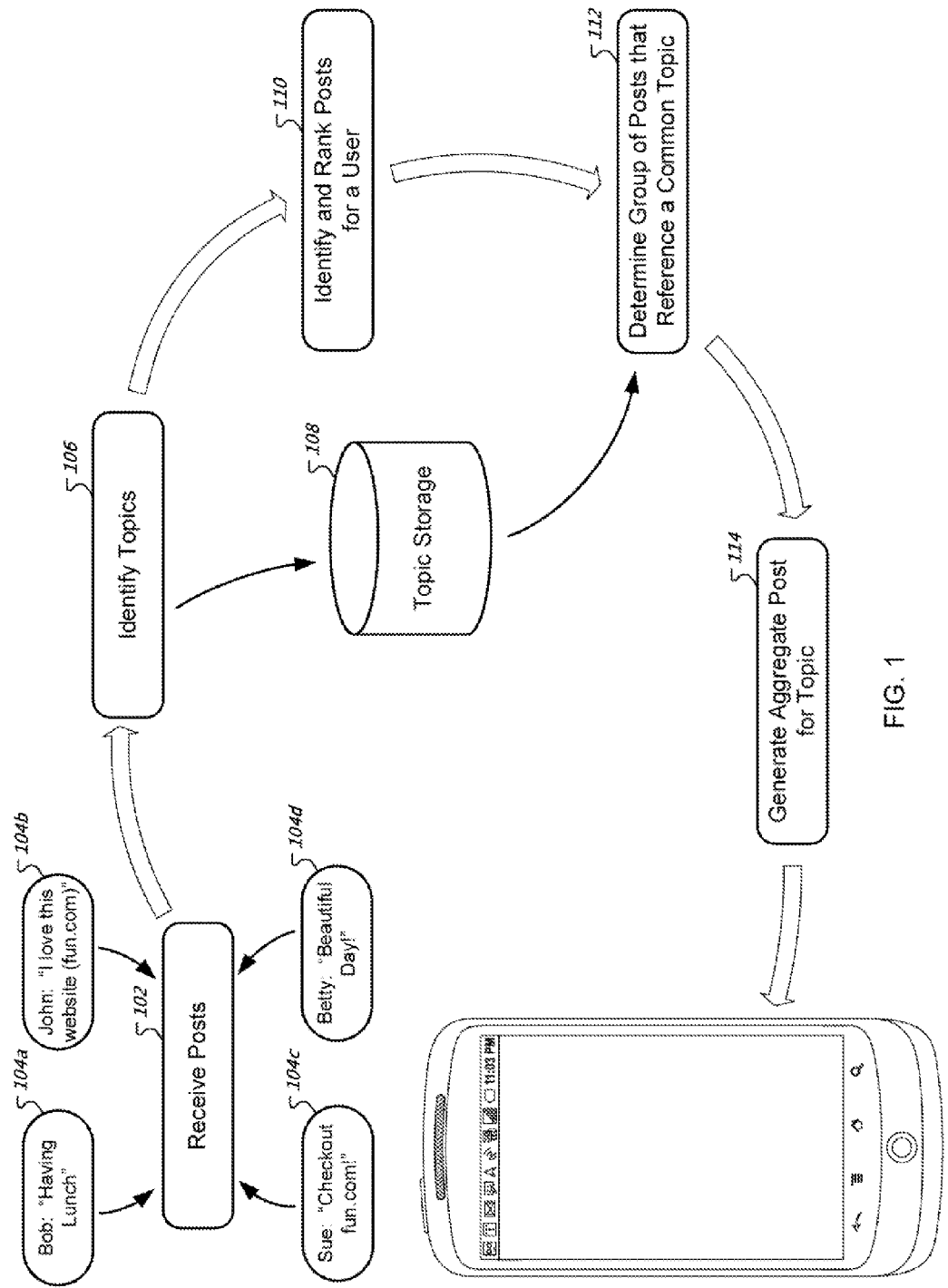
FIG. 1 illustrates a method for displaying an aggregate post in place of individual posts that are submitted to a messaging service.

This document generally describes aggregating posts that were submitted to a messaging service. In general, a user of a social network messaging service may view a content stream of posts that have been authored by users of the social network who the user "follows," or who were geographically near a location of the user when their posts were authored (and who have authorized messaging service identification of post location). The posts in the content stream may be ordered for display, at least in part, based on a time of submission to the messaging service.

Some of the posts may reference a common topic, and thus may be aggregated into a single post for display to the user. For example, multiple users may submit posts that each include the same URL. Instead of displaying each of the posts separately (and possibly at non-adjacent positions within the content stream), the messaging service may generate a single aggregate post for displaying content that is drawn from the document referenced by the URL. The single aggregate post may include a single topic that is common to the posts, and user-defined portions of each of the individual posts.

The aggregate post may visually identify each of the users that submitted the separate posts. In various examples, the common topic is a URL, contact information (e.g., telephone number, geographical address, or email address), or a predetermined keyword. In various examples, a display of an aggregate post identifies, as a primary author of the aggregate post, an entity that is associated with the common topic and that is different than any of the authors of the individual posts.

The primary author of the aggregate post may be a user of the social network that is affiliated with the common topic. For example, the primary user may be associated with several keywords, in some examples an exclusive association among all users of the social network. As an illustration, administrators of the social networking system may have authenticated that a user account for a famous musician is indeed the famous musician's social networking account, and thus may permit the user account to reserve specific terms (e.g., the famous musician's name and the name of the famous musician's band). If either of these terms is identified as a common topic among multiple posts, the famous musician's account may be selected as the primary author.

Similarly, a user account may be associated with a website domain, and a common topic that is a URL that includes the website domain may cause selection of the user account as the primary author for an aggregate post that is based on the common topic. As an illustration, the New York Times may have reserved the website domain www.nytimes.com. Thus, if a common topic among multiple posts is determined to be the URL www.nytimes.com/examplestory, the "New York Times" may be selected as the primary author for an aggregate post. Further, identifiers for venues (e.g., a name of the venue or a numerical identifier that corresponds to the venue) may be reserved for user accounts. Further, a common topic that is a name of a user account may be used to select the user account as an primary author.

In some examples, the primary author of the aggregate post did not submit to the social network a post that included the common topic. For example, the aggregate post may be formed based on several users submitting posts that included the same URL. The primary author, however, may not have submitted a post to the social network that included the URL. In some examples, the primary author of the aggregate post is not in an acquaintanceship relationship with the user that is viewing the aggregate post. An acquaintanceship relationship is a direct relationship in a social graph between users of a social network, as opposed to an indirect relationship. A direct relationship between two users may be formed when a first of the two users requests to receive posts that are submitted by a second of the two users. In some examples, the second of the two users provides permission for the first user to receive the posts. Accordingly, aggregate posts may be a way to introduce into a user's feed of posts individual users that the user does not "follow" but that several of the user's friends have referenced.

In some examples, an aggregate post displays an image of the primary author, where the image may be a "profile picture" (also referred to herein as a primary image) that the primary author configured in social networking settings to accompany post submissions by the primary author. In some examples, selection by a viewer of a profile picture that is displayed for the primary author, or text that lists the primary author's name, causes navigation to a webpage on the social network that is reserved for the primary author. The primary author may be able to log into the social network and change the content for the reserved page. An example of such a page may be a social networking "profile page."

In some examples, a user of the social network can "check-in" to a particular venue. For example, the user may browse a list of venues that are geographically nearby the user's mobile computing device based on an estimated geographical position of the mobile computing device. The user may select one of the venues. In response, the user may be "checked-in" to the venue so that all posts that the user provides while the user remains "checked-in" are accompanied by a display of the user's "checked-in" venue. The user may not provide separate user input for each post that identifies the venue. The user may later provide user input so that the user is no longer checked-in to the venue.

FIG. 1 illustrates a method for displaying an aggregate post in place of individual posts that are submitted to a messaging service. The features of a messaging service are described herein. Other names for the described messaging service may include a "communication tool" and a "data sharing service." At box 102, a server system that is hosting a social network messaging service receives multiple posts (i.e., electronic messages). As an illustration, FIG. 1 depicts four posts 104a-d that the server system has received. The four posts 104a-d were authored by users who are members of the social network at computing devices at which each of the users supplied credentials to access respective social network user accounts. As indicated in FIG. 1, the posts by Sue and John each share a common URL (i.e., "fun.com"), although the overall content of Sue and John's posts is unique.

In some examples, posts do not identify recipients of the posts. In other words, the electronic transmissions from the computing devices at which the posts are authored to the server system may not include information that designates individual social network users that are to receive the posts. Instead, the server system may identify users that "follow" the authors of the posts, and may disseminate the posts to these following users.

In various examples, a post includes textual content that a user typed into a text field in a webpage of a social network. The user may transmit the post to the social network by selecting a user interface element, for example, that is labeled with the text "submit." The post may include the user-provided information and any message headers that are used to transmit the post to the social network and identify an author of the post. The post, however, may not include user-provided recipients of the post.

In various examples, a user may view a post by another user and may click on a "share" button. In response, the post may be rebroadcast to all of the user's followers, or specific followers that the user identifies. In some examples, a user may view an article on a third-party website and click a "share" user interface element. In response, a post may be broadcast to all of the user's followers, or specific followers that the user identifies. The post may identify the website (e.g., with a URL or title), include a portion of content from the website (e.g., an article title, an image, and descriptive text), and allow the user to comment on the website content.

In various examples, a user may submit a post while "checked-in" to a venue (e.g., a business or geographical place). While the user is checked-in, posts that are submitted to other users via the social network may identify the checked-in venue as a place of posting for the user, without the user providing input identifying the venue for each individual post. When a user has checked into a venue, the user may be presented an option to rate the venue using a preconfigured rating system. For example, the user may be able to select graphical interface elements for rating the venue between one and five stars, or for providing an up-vote or a down-vote. The user may provide text that accompanies the rating. The text and the rating may be combined in a post to the social network. In some examples, the user rates venues on third-party websites. The ratings (and any descriptive text) may be transmitted to the social network as a post.

As described in more detail later, a particular user may request to view a stream of posts that have been recently authored by users that the particular user follows. In response to the request, the server system may retrieve those posts that are marked for dissemination to the particular user, generate a document that will display each of the posts, and transmit the document to a device at which the particular user has provided credentials (e.g., a username and password) to log into the social network (where transmitting the document may include transmitting data for individual posts that may be assembled using an app or application executing on the device).

At box 106, the server system identifies topics that are referenced in the received posts. For example, the server system may match the received posts against a set of regular expressions to detect, for example, URLs and telephone numbers in the received posts. The server system may also compare the received posts against a predetermined list of textual keywords. The predetermined list of keywords may include famous people, places, things, and concepts. The predetermined list may be generated based on any appropriate combination of, for example, popular search queries and keywords that are referenced in recent news articles that are indexed by a news search engine.

Figure 2:
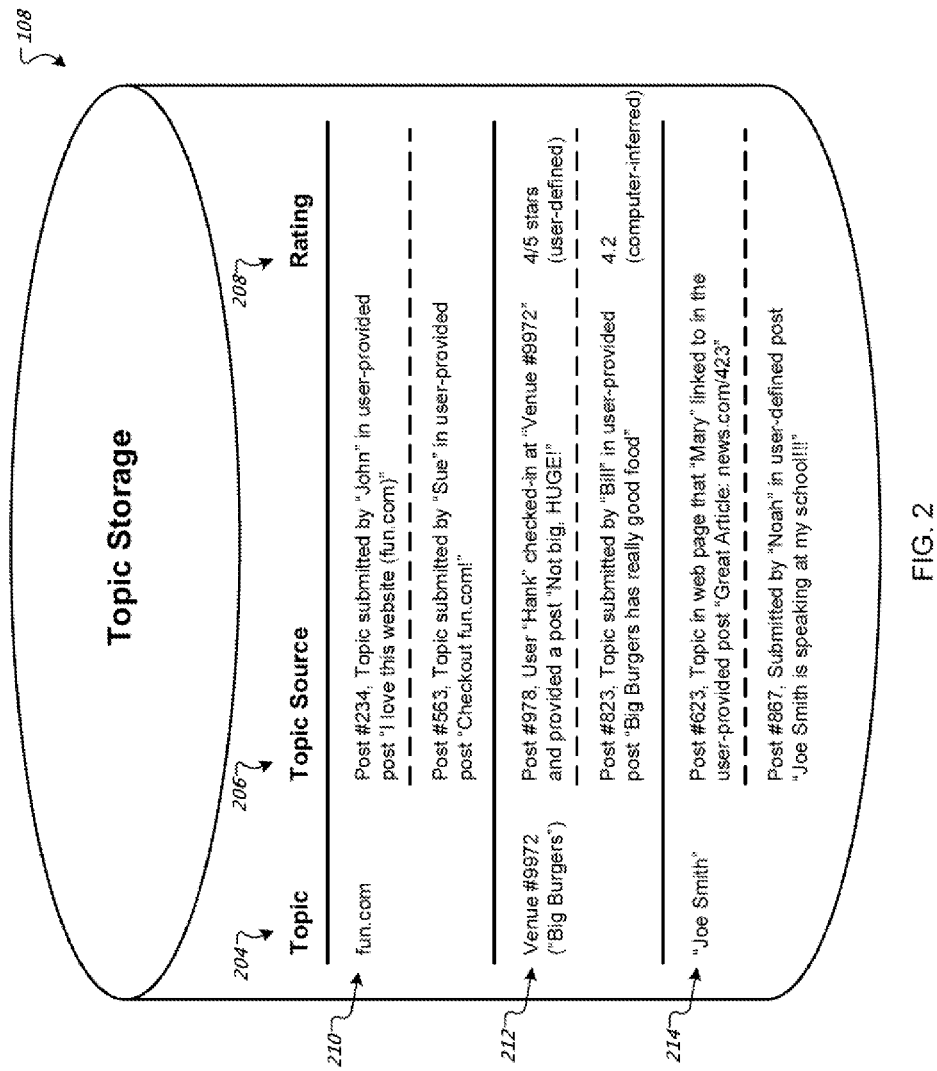
FIG. 2 illustrates topics and posts that reference the topics.

Various topics, and the identification of the topics from posts, are described in more detail with reference to the topic storage database 108 that is illustrated in FIG. 2. Topic storage database 108 is illustrated as including three topics under the "topic" column 204: "fun.com," "Venue #9972," and "Joe Smith." Each topic is identified under the "topic source" column 206 as having been referenced by two posts. The "Rating" column 208 identifies user-defined and computer-inferred ratings for some of the posts.

In some examples, at least some of the topics are not predetermined. For example, the server system may perform abstract topic abstraction by comparing a large volume of posts and selecting a cluster of posts that reference similar content. A topic may be identified from such a cluster, in some examples. In other examples, an aggregate post may be generated from at least some of the posts in the cluster, without identification of a topic.

The topic storage database 108 includes the topic "fun.com" 210. This topic has been referenced by two user-defined posts, post #234 from "John" and post #563 from "Sue." Each post was user-provided, which may indicate that the topic was identified as being a subset of user-provided content. The topic "fun.com" 210 may be determined, by a regular expressions algorithm, to be a URL. Posts that are determined to include a URL may be added to the topic storage 108 under the topic source column 206.

The topic storage database 108 also includes the topic "Venue #9972" 212. In this example, post #978 was submitted by user "Hank" in response to Hank checking-in to the referenced venue and submitting a post while checked-in at the venue. Accordingly, the post may include a numeric identifier that identifies the venue at which user of the post had checked-in. The numeric identifier may not be displayed to recipients of the post, but may be included in non-displayed post content (although a name of the venue—"Big Burgers"—may be resolved from the numeric identifier and displayed to the recipients).

The topic Venue #9972 is also referenced by post #823. In this example, post #823 is a post that included the user-provided content "Big Burgers has really good food." Although Bill did not include the text "Venue #9972" in his post (and may not have been checked into the venue when the post was submitted), the server system may, during a process of identifying topics in the post, identify venues that reference user-provided text. In this example, the text "Big Burgers" is identified as user-provided text that is referenced by the topic "Venue #9972" (e.g., because a database stores the text "Big Burgers" in association with the topic "Venue #9972"). Accordingly, the post is designated as referencing topic "Venue #9972."

Both of the posts that are keyed to the topic "Venue #9972" are illustrated as including a rating. For example, post #978 is identified as having a "4/5 stars" user-defined rating. The rating may have been transmitted to the server system with the post, and may have been input by an author of the post using graphical interface elements for selecting a quantity of stars which to assign to the venue "Big Burgers" as a rating. In another example, post #823 is identified as having a rating of "4.2," based on computer-performed sentiment analysis of the post content. For example, the server system may have identified, from the user-provided content of the post, not only that the author was referencing the store "Big Burgers," but that the post included text that reflected favorably upon the restaurant (e.g., the post included the text "really good"). A sentiment analyzer at the server system may perform the sentiment analysis and assign the rating.

The topic storage database 108 also includes the topic "Joe Smith" 214. The topic "Joe Smith" may have been included as a keyword on a list of entities that are referenced frequently in search queries. In this illustration, "Joe Smith" is identified as having been referenced by post #623. Although post #623 may not have included the user-provided text "Joe Smith," the post included a user-provided URL that identified a web resource that included the text "Joe Smith." Post #867, on the other hand, is a user-defined post that included the text "Joe Smith is speaking at my school!!!" Thus, both posts are identified as having referenced the common topic of "Joe Smith."

Accordingly, the topic storage database 108 is populated with data that identifies topics, the posts that reference the topics, and optionally ratings that accompanied the posts or that may be determined from a content of the posts.

In various examples, topics are not stored in a database. In various examples, topics may be determined by the messaging service during run time and stored only in temporary memory (e.g., RAM). As discussed above, topics may be determined by analyzing a set of posts and clustering sub-sets of the posts that include similar content.

At box 110, the server system identifies and ranks posts for a particular user of the social network. For example, the server system may identify a plurality of posts that have been authored by various users of the social network, and to which the particular user "follows." These posts may be ranked so that they may be displayed to the particular user in a ranked order, or based at least in part upon the ranked order. Each post may be scored based on any combination of various factors, including, for example: (i) time of post receipt, (ii) content of post (e.g., length and inclusion of multimedia content), (iii) previous display of post to the user, (iv) quantity of comments on post by other users, (v) quantity of "likes" on post by other users, and (vi) history of the particular user-commenting on or "liking" posts by the author of the particular post. A post with a most-favorable score may be ranked first, a post with a second most-favorable score may be ranked second, and so forth.

At box 112, a group of posts that reference a common topic are determined. In some examples, this determination is performed by iterating through the most-favorably ranked posts. For example, the server system may iterate from the highest ranked post until "N" posts have been output for display to the user (where N may be a predetermined quantity of posts that can be displayed to the user on a screen). For each post, the server system may identify in the topic storage database 108 whether the post references a topic. If the post does not reference a topic, the post may be output for individual display in its ranked order.

If the post does reference a topic, the server system determines if other posts that are designated for display to the user also reference the topic. If so, an aggregate post may be generated based on the determined group of posts that reference the topic. In some examples, the aggregate post may be given a ranking of the post that triggered the generation of the aggregate post. In some examples, the aggregate post may be scored based on factors of each of the group of posts. In some examples, the aggregate post may be scored more favorably the greater quantity of individual posts that referenced the common topic. The ranking of the aggregate post may be based on the score of the aggregate post, and may be more prominent than an initial ranking of the triggering post.

In some examples, the group of posts that reference the common topic are determined before the posts are ranked. For example, the server system may identify a group of posts that reference a common topic, and after the group has been identified, may perform the ranking of box 110. The ranking of box 110 may rank the aggregate post as a single entity and not individually rank the individual posts that make up the aggregate posts.

In some examples, a post that references a common topic is not designated as being part of a group of posts that reference the common topic. The post may not be designated because the post may be determined to include substantive content that would be of interest to a user. For example, if a post includes a predetermined amount of characters, includes predetermined types of multimedia content, or has received a predetermined amount of "likes" or "comments" by other users of the social network, the post may be left as an individual post and not joined into a aggregated post. In other words, if the post is highly-scored, the post may not be joined into an aggregate group.

At box 114, an aggregate post is generated for the topic. For example, a web document may be generated for transmission to the user, where the web document is configured to display a vertical stack of posts as a visual representation of a content stream. The vertical stack of posts may include one or more visual representations of individual posts, and one or more visual representations of aggregate posts. The document may also be transmitted as individual components that may be assembled in an appropriate manner by an application or app executing on the user's device.

A visual representation of an individual post may include: (i) a name of an author of the post, (ii) an image of the author of the post (e.g., an image drawn from a profile picture of a user account for the author), (iii) content of the post (e.g., the user-defined content that the author provided just prior to submitting the post), and (iv) user interface elements for interacting with the post (e.g., interface elements for commenting on the post).

A visual representation of an aggregate post may be different than a visual representation of an individual post. For example, a primary author of an aggregate post may not be a user that submitted any of the posts that referenced the common topic (and indeed may not be a user that the recipient user follows). Instead, the post author may be an entity referred to by the common topic. For example, the common topic may be an article by the New York Times. Thus, the author of the post may be designated as the New York Times Company, and an image that is associated with the New York Times Company may be displayed for the author.

The aggregate post may visually identify the users that submitted the posts that referenced the common topic (e.g., with icons identifying the users). Each icon for the users may be accompanied with a user interface element (e.g., an icon or a coloring of the user's name) that indicates a sentiment of the users, as described throughout this document. In some examples, the system determines a sentiment of all the users of averages the sentiment or otherwise generates a summary of the sentiment of the users, and displays a visual indication of the overall sentiment of the users. The icons for the individual users, however, may be smaller than the image for the primary author, may be displayed in a less-prominent position (e.g., near a bottom of the post instead of a top of the post), and may be unaccompanied by names of the authors. Various other features of individual posts and aggregate posts are illustrated with reference to FIGS. 3A-B. In some examples, an image for a primary author (whether for an individual that submitted a post, or for an entity that is referred to by the common topic) appears in the same position within an individual post and an aggregate pose, and with the same size.

Accordingly, the web document may transmitted from the server system to the computing device at which the user has logged into the social network. At the computing device, a web browser may render the web document for display by the computing device to the user. The content stream (including one or more aggregate posts and one or more individual posts) may be displayed to the user.

Figure 3:
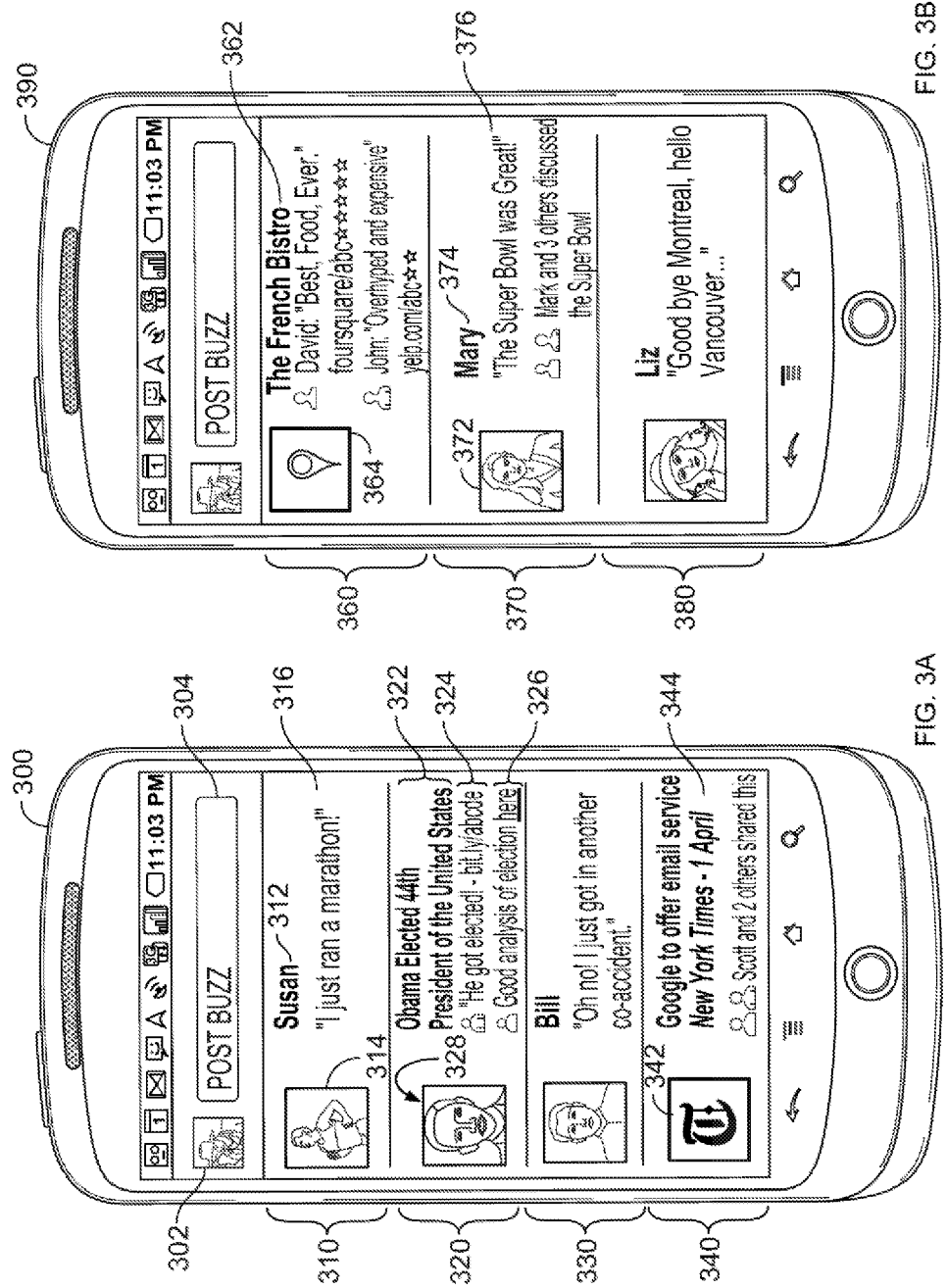
FIGS. 3A and 3B illustrate mobile computing devices that display posts that were submitted to a messaging service.

FIGS. 3A and 3B illustrate mobile computing devices that display posts that were submitted to a messaging system. For example, mobile computing device 300 is displaying a social networking user interface. The social networking user interface may be displayed, for example, by a web browser in response to a user requesting navigation by the web browser to a particular URL. The user interface may also be displayed by an application program that has been downloaded to the mobile computing device 300 from an application store or by a native application that was installed locally from some other source.

The social networking user interface displays an image 302 of the particular user that has logged into the social networking user interface using the mobile device 300. The user interface also includes a text box 304 for generating posts. For example, the particular user can select the text box 304 (e.g., by tapping on the text box), and in response to a cursor appearing in the text box, type textual characters into the text box. The user may then select a "submit" button to submit the post to the social networking system. In various examples, the user interface enables a user to submit an audio comment, a photograph, or a video to the messaging service. In such examples, the post may or may not include text that the user input using the text box 304.

Beneath the text box 304 is a content feed of posts that have been submitted to the social network by users to which the particular user "follows," or who were geographically near a location of the user when their posts were authored (and who have authorized messaging service identification of post location). For example, a most-favorably displayed post 310 was submitted by Susan. In this example, post 310 is an individual post that identifies a single author that submitted the post. For instance, the post includes a name of the post author (i.e., the text "Susan" 312), an image 314 of the post author, and content that Susan provided (i.e., the text "I just ran a marathon!" 316). Other users of the social network that also follow Susan may view a same or similar display of the post 310.

The content feed includes another individual post 330 that Bill submitted. Bill's post 330 states "Oh no! I just got in another car accident." Bill's post 330 is presented in a third most-prominent position because, for example, Bill's post may be older than Susan's post 310, the viewing user does not visit Bill's profile page as much as Susan's profile page, or because Susan's post 310 has received more comments than Bill's post 330.

The content feed also includes two aggregate posts, post 320 and post 340. Post 320 is an aggregate post because the post was generated based on the content of two posts that referenced a common topic. In this example, a first post by Hank stated "'He was elected!'—bit.ly/abcde" and a second post by Marge stated "Good analysis of election here" (where the text here is a selectable hyperlink to the website www.obama.com). The social networking server system may have determined that the posts may be combined into an aggregate post because both posts include a link that references the same website. Hank's post includes a hyperlink to a URL shortening service, which the server system determines redirects to the website "www.obama.com." Marge's post includes a hyperlink that directly addresses the website "www.obama.com," even though the displayed content of Marge's post does not present the text www.obama.com.

In aggregate post 320, the primary content is text 322, which was not included in either of the individual posts by Hank or Marge. The text 322 may be deterministically selected from the website www.obama.com. A primary image 328 for the post may also be deterministically selected from the website. Thus, an "author" of the post may not appear to be Hank or Marge, but may appear to be an entity that is referenced by the common topic. In various examples, selection of the primary image 328 causes navigation to a profile page of a user account, or a website that is associated with a specific user account. The image 328 may be a profile picture for the specific user account. Thus, the post 320 may appear as if the post was submitted by the specific user account (even though the viewing user may not follow the specific user account, and the specific user account may not have submitted the post 320, or content in the post 320, to the social network).

The aggregate post 320 may visually indicate that it is an aggregate post because a bottom portion of the post references the users that submitted posts referencing the common topic. For example, aggregate post 320 includes a condensed display 324 of Hank's post and a condensed display 326 of Marge's post. The displays may be condensed because the displays include a smaller image than the author's image 328, because the displays do not textually identify the authors, and because the displays of the posts may not present more than a single line of text for each post (although in this example both posts' textual content can fit on a single line).

Aggregate post 340 is another example display of an aggregate post. In this example, three users have shared a same article to the New York Times. For example, each of the users may have visited a web page that presented the article and selected a "share" button on the website to broadcast the link to their followers on the social network. In this example, the New York Times Company may have included the "share" button on a web page for each of their articles, and associated the buttons with an account on the social networking system. The account may designate an image to display for New York Times articles (e.g., the image 342), and a mechanism to automatically select text 344 for display in an aggregate post (e.g., by selecting the title of the article, the name "New York Times," and a date that the article was submitted).

Although the users that shared the article may have each submitted comments to the article (e.g., "Read that last paragraph" and "I can't wait!"), such content that is unique to each post may not be displayed in the aggregate post. Content that is unique may include content in a body of each post that is not also found in each of the other posts in that reference the common topic. Instead, the aggregate post 340 may display an image of each of the users, or a portion of the users, that shared the article.

The aggregate post 340 states a name of one of the users that shared the article (i.e., the name "Scott") and an indication of how many other users shared the article (i.e., "2 others shared this"). In various examples selecting the text "Scott" can cause navigation to Scott's profile page, or can cause expansion of the post 340 to display the content of Scott's post as part of the aggregate post 342. In some examples, selection of the text "2 others shared this" can cause expansion of the post 340 to display all the individuals that shared the post, and optionally display the user-provided content that is unique to each of the users.

In these examples, each of the posts 310-340 reference a primary user. The primary user may be identified with a profile picture (e.g., a profile picture 314, 328, or 342). Selection of the profile picture may cause navigation to a profile page on the social network for the primary user. In various examples, the primary user for an aggregate post is not a user that provided one of the individual posts.

As an illustration, and with reference to aggregate post 340, "Scott" and two other acquaintances of the user 302 may have shared a link to a New York Times article. Because the common entity is the New York Times article, the social network may determine a user of the social network that is affiliated with the article (e.g., the social network may identify a New York Times user account). Thus, the New York Times user account may become the primary social network user for the aggregate post 340 (also referred to herein as the primary author).

The primary user for an aggregate post may share characteristics with a primary user for an individual post. For example, a profile picture of a primary user may appear in the same location within individual posts as with aggregate posts. For example a profile picture of a primary user may appear with the same size for individual posts as with aggregate posts.

The social networking interface of mobile computing device 350 includes a display of a content feed that includes aggregate posts 360 and 370, and an individual post 380. Aggregate post 360 was generated in response to two users, David and John, each submitting reviews for a venue "The French Bistro." For example, David may have logged onto a first social network, "checked-in" to The French Bistro, and provided a review of the restaurant that included the text "Best. Food. Ever." and the rating five out of five stars. John, who has a different impression of the restaurant, logged onto a second social network and stated that he thought that the restaurant was "Overhyped and expensive." John only gave the restaurant two out of five stars.

Although the posts may be associated with different social networks, the described system may provide the posts to followers of the respective authoring users. Each of the posts may include information that identified the venue that was being reviewed, and accordingly, the venue may be designated as an author of the post. For instance, the displayed portion of the post that identifies an author of the post may include the text "The French Bistro" 362. The image 364 is designated as a map pin to indicate that the referenced venue is a venue.

The aggregate post 370 is referenced as having been authored by Mary. In this example, a top portion of the post 370 appears the same as an individual post (e.g., post 310). The top portion includes an image 372 of the post author, a name of the post author 374, and content 376 that was provided by the post author. In this example, however, the keyword "Super Bowl" was identified as a topic that was common among Mary and four other individuals of the social network. The server system may have performed an analysis to determine that the Super Bowl posts were individually not substantial in content (e.g., each of the five posts was short). Thus, the server system may group the posts together in an aggregate post. In this example, a bottom portion of the aggregate post 370 identifies "Mark and 3 others" as other users that "discussed the Super Bowl."

In some examples, user selection of the text "Mark and 3 others" may cause expansion of the post 370 so that the post 370 fills more of the display and includes content that is unique to each of the posts by Mark and the 3 others. In some examples, a bottom portion of the aggregate post 370 appears similar to the bottom portion of post 320, where at least a subset of the user-provided content for each of the posts is displayed. Individual post 380 indicates that user Liz has stated "Goodbye Montreal, hello Vancouver . . . ."

Figure 4:
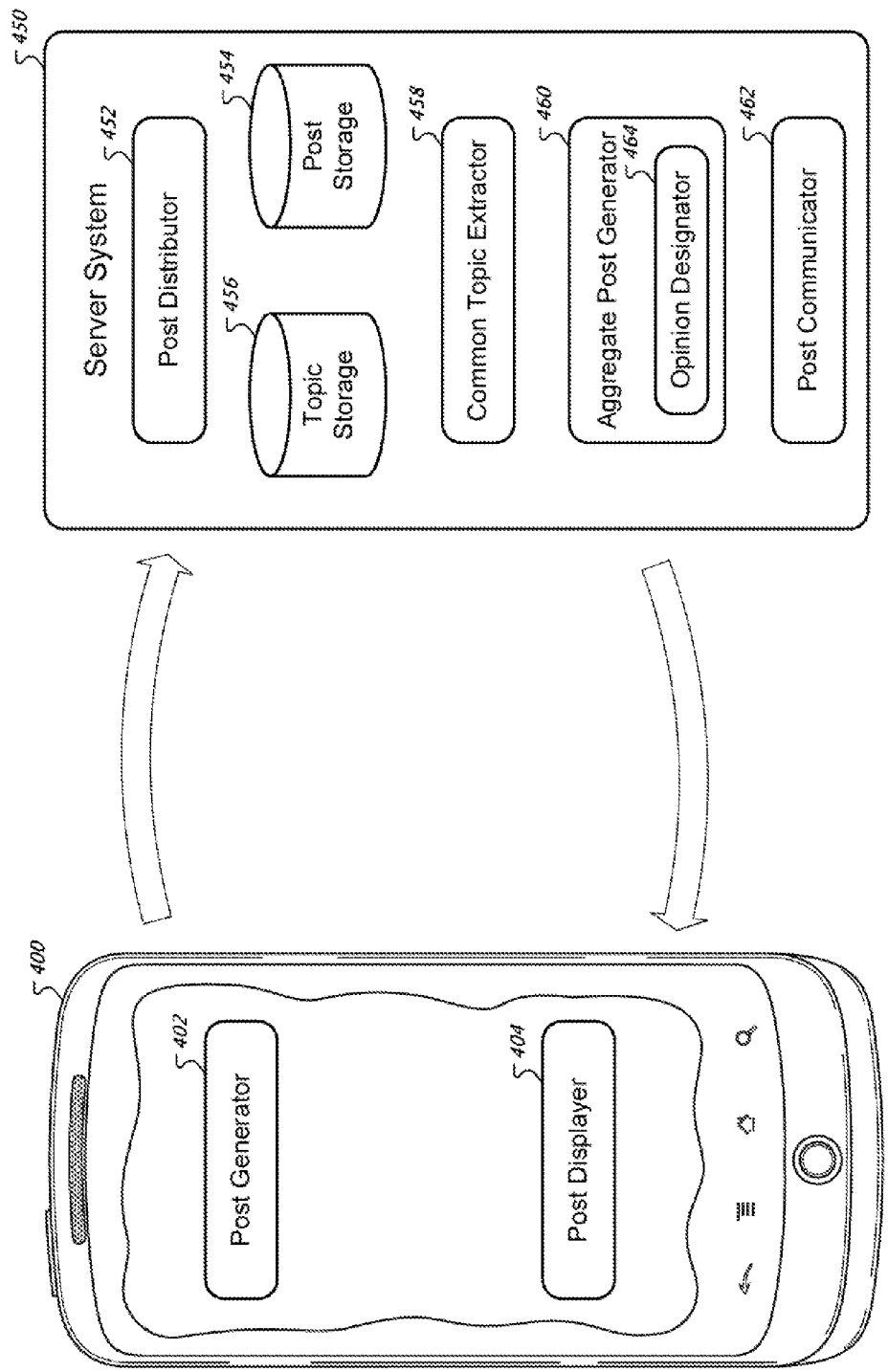
FIG. 4 is an example system for aggregating posts that were submitted to a messaging service.

FIG. 4 is an example system for aggregating posts that were submitted to a messaging service. Mobile computing device 400 includes a post generator 402 that is programmed to generate posts for transmission to the server system 450. The post generator 402 can include javascript code that is executed by a web browser to receive textual user input in a text box. For example, each of the individual posts 310, 330, and 380 that are displayed in FIGS. 3A-B may have been generated by a post generator 402. The content of such individual posts may be aggregated with other posts to generate an aggregate post (e.g., any of aggregate posts 320, 340, 360, or 370). The post that is generated may be plain text, HTML, or XML that is transmitted by the post generator 402 to the server system 450 in an XHR (XMLHttpRequest) request.

The server system 450 may include a post distributor 452 that is programmed to receive a plurality of posts (e.g., in response to searching for relevant posts), and assign for each of the posts, a plurality of recipients. The recipients for a submitted post may be assigned based on the recipients each "following" the authoring user of the submitted post. In various examples, a post may include in a body of the post an identification of a user as an @replied user. The @replied user may be identified as a recipient of the post, in addition to users that follow the authoring user. The assigned recipients may be recorded in the post storage database 454, which may also store the content of the posts that are received. Thus, when a user requests a web document for displaying a stream of posts, the post distributor 452 may access the post storage database 454 to identify posts that have been designated for receipt by the user.

The common topic extractor 458 is programmed to parse through a body of a post and identify a topic that is referenced in the post. The common topic extractor 458 may store the association between the topic and the post in the topic storage 456. Accordingly, upon the server system 450 receiving a request to provide a list of posts to a recipient user, the common topic extractor 458 can identify a group of posts that are designated for receipt by the recipient user, and that each reference a common topic. In various examples, a body of a post may be a field that is in addition to a subject field of a post, or may be an exclusive field for a post (e.g., an only field for generating the post). The operation of the common topic extractor 458 and the topic storage 456 was discussed with additional detail with reference to FIG. 2.

The aggregate post generator 460 is programmed to receive an identification of a group of posts that reference a common topic, and generate programming code that causes a computing device to provide a display of an aggregate post in place of individual displays of the group of posts. For example, the aggregate post generator 460 may generate HTML code that causes the post displayer 404 at the mobile computing device 400 to display any of the aggregate posts 320, 340, 360, or 370. Upon generation of the aggregate display, each of the individual posts in the group may be deleted from the post storage database 454, or otherwise designated so that the posts will not be individually displayed in the content stream in the future. An individual post generator (not illustrated) can generate programming code that causes a computing device to provide a display of an individual post (e.g., posts 310, 330, and 380).

The opinion designator 464 provides, within an aggregate post, a visual indication of the opinions of the contributing authors. In some examples, the opinions may be based on the user-provided content to each post. For example, messages #978 and #823 (in FIG. 2) were associated with user-defined and computer-inferred ratings, respectively. Visual indications of these ratings may accompany the visual indications of the contributing authors to an aggregate post. As an illustration, the display of aggregate post 360 includes five stars that are associated with David and three stars that are associated with John.

In some examples, the visual indication of the opinion is based on a computer-inferred analysis of post content. For example sentiment analysis may be performed of user-provided text in a post to identify the post author's opinion towards a topic that is common to the post and other posts. The visual indication may be a quantity of graphical interface elements (e.g., a quantity of stars), a displayed number (e.g., the number "4.2 out of 5.0"), a single graphical interface element selected from a set (e.g., a thumbs up or a thumbs down icon), or a color of a border that surrounds the icon for the contributing user (e.g., where green may indicate favorable opinion and red may indicate an unfavorable opinion).

The post communicator 462 is programmed to provide information that causes a visual display on the mobile computing device 400 of the aggregate post and the individual posts. For example, the post communicator 462 may transmit a web document from the server system 450 to the mobile computing device 400. In some examples, the post communicator 462 exists on the mobile computing device 400 and provides information for causing a display of individual and aggregate posts to another component of the mobile computing device 400.

The post displayer 404 is programmed to cause a display of individual posts and aggregate posts (e.g., the displays provided in FIGS. 3A-B). In some examples, the post displayer 404 is or includes a web browser that receives a web document and causes a visual display of the web document.

Figure 5:
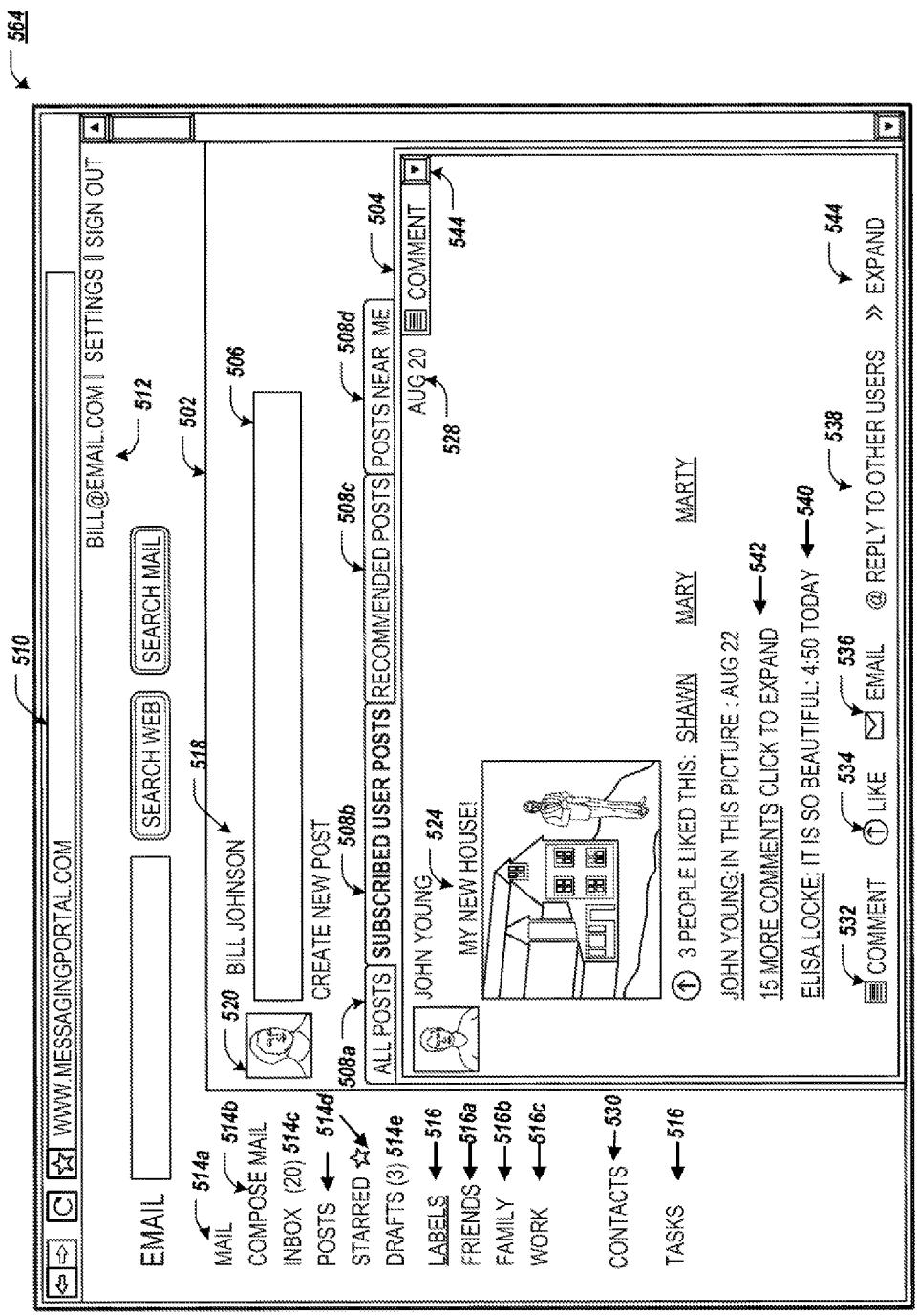
FIG. 5 is a screenshot of an example web-based messaging system interface.

FIG. 5 is a screenshot of an example web-based messaging system interface. The interface 500 can be viewed by a user of a social networking system after the user logs into the user's account. The interface can enable the user to submit posts and receive posts from other people. In this illustration, Bill Johnson has logged into the messaging interface 500 and is viewing, in the content region 502 of the interface, a post 504 from John Young. Tabs 508a-d allow Bill to view differently filtered lists of posts. Bill can submit a post using the input area 506.

More specifically, Bill can visit the messaging interface 500 with an internet browser by typing a URL associated with the portal into the address bar 510. Bill may be prompted to enter his username and password before he is provided use of the interface 500. Upon having logged in, the user account 512 that Bill is logged into may be displayed in the interface window.

User-selectable interface elements allow Bill to toggle presentation of content in the content region 502 of the interface. If Bill selects the "Mail" link 514a, a list of received email messages may display in the content region 502. Selection of "Compose Mail" may invoke presentation of an interface for sending emails (e.g., by typing an address of a user, typing a subject, typing textual content, and clicking a submit button). Selection of the "Posts" link 514d may invoke the micro-blogging service interface displayed in the content region 502.

The micro-blogging interface can display a name 518 and picture 520 of the user that is associated with the account 512. In this illustration, the name "Bill Johnson" is associated with the user account "Bill" for the micro-blogging service domain "email.com." The input area 506 of the micro-blogging interface may allow Bill to submit content for dissemination to other users of the micro-blogging service. For example, Bill may move a mouse cursor over the input area 506 and click in the input area 560. Upon selecting the area, Bill may type a textual string of characters "I just had the best day ever, and want everyone to know it!" The characters may appear for display in the input area 506.

User-selection of the input area 506 may invoke a display of controls for adding multimedia content to the input area, or for inclusion in the post. For example, graphical user interface elements may appear after Bill clicks in the input area 506. The graphical user interface elements may enable Bill to add a picture to a post or a video to the post, either by selecting a source file on his computer or identifying a source file from a location on the internet. If Bill types or pastes a Uniform Resource Locator (URL) in the input area 506, a server system that hosts the messaging interface (or code operating locally at Bill's client device) may identify the string of characters as a URL and fetch content from the URL for inclusion in the post. For example, the messaging service may present a list of pictures that are drawn from a source document that is associated with the URL, and Bill can select a subset of the displayed pictures to include in the post that he is composing. Thus, a summary of content that is drawn from a URL may be displayed in the user interface. Bill may then select portions of the content to include in the post (e.g., individual pictures or text).

When Bill is satisfied with the post that he has generated in the input area 506, Bill may select a "Post" graphical interface element. In this example, the "Post" interface element is not displayed in the screenshot 500, and is provided for display upon user-selection of the input area 506. After selection of the "Post" interface element, Bill's post is transmitted by his client computing device to a server system that hosts the micro-blogging messaging service. The server system may identify users that have agreed to receive Bill's posts, and may transmit an instance of Bill's post to each user.

In some examples, the "post" may include only the textual and multimedia content that is visible to Bill, or the textual and multimedia content that is viewed by the recipient users. Thus, a description of all post content may be made by a person if the person can display a screenshot of either Bill's display or a recipient user's display. In other examples, the "post" includes additional information necessary to transmit the post, and for the server system to handle the received post. For example, the additional information may include an identifying number for Bill, a source uniform resource identifier (URI) for multimedia content, etc. The additional information may not be visible to Bill or recipient users. In some examples, a post does not identify users or user accounts to whom the post should be transmitted or disseminated.

The micro-blogging interface also displays posts from other users. For example, in the illustration depicted in FIG. 5, a single post 504 from the user John Young is displayed. John's post may be a most recent post or most highly ranked post of several posts that may be viewed by scrolling down in the interface using the scroll bar 522. John's post can also be referred to as an "activity" because the post, while originating with content from John, may be expanded with content from other users of the micro-blogging service. For example, in this illustration John's post included the title "My New House!" 524 and a picture 526 of his house. John's post did not include any additional content and was submitted on the date 528 of August 20.

John's post was received by the micro-blogging service's server system and disseminated to the other users of the micro-blogging service that had selected John as an individual that they would like to follow. For example, Bill may have selected the "Contacts" link 530 and entered into an input box John's email address and name. The micro-blogging service may have identified that John's email address was associated with a micro-blogging account and Bill may have requested to subscribe to John's posts. In some examples, John is prompted to confirm that Bill may receive his posts before John's posts are disseminated to Bill.

John's post also shows that three people (Shawn, Mary, and Marty) "Liked" John's post. A "Like" is an indication, by a recipient of a post, that the recipient has a favorable opinion of the post. A like may be invoked by a single-input user selection of a graphical interface element (e.g., the "Like" button 534). In various examples, John's post may show that a person that did not like John's post (e.g., a "Dislike").

John's post also shows that on August 22, a user tagged or otherwise indicated that John Young was in the picture of the house. In this illustration, a user that tagged John is not identified, however, a visual identification of a tagging user may be provided, in some examples.

John's post includes a display of a comment 540, "It is so Beautiful" by Elisa Locke at a time of 4:50 today. Elisa Locke may have received a display of John's post in a micro-blogging interface similar to the one depicted in FIG. 5 Elisa may have selected a comment button 532 and entered the text "It is so Beautiful" into a comment input box. Upon sending the comment, John's post may be updated to include Elisa's comment (as illustrated in post 504), and the updated post may be re-disseminated to all post recipients. John's post also includes an interface element 542 that enables Bill to expand a display of John's post to show comments from other users that are collapsed in the present view.

The messaging interface 500 includes mechanisms for Bill to interact with John's post. For example, Bill may select the comment interface element 532, and in response, user interface elements and controls may appear that enable Bill to generate and submit textual or multimedia content for inclusion in the post. The comment is distributed to all users that received the post so that when these other users view the post they see Bill's comment. The post may be updated for all users, whether the users have viewed the post previously or not.

Bill can also select a "Like" interface element 534 to indicate his favorable opinion of the post. Selection of the "Like" interface element 534 can impact a scoring of the post (potentially increasing a likelihood that the post will be displayed to other users as a recommended post), alert other users that Bill thought that the post was interesting, and be used to develop a personalized model of posts that Bill likes (to aid in providing relevant content as recommended posts for Bill's account).

Bill may add other people to the post. For example, Bill may select the "@ Reply" interface element 538. In response, graphical interface elements and controls may display that enable Bill to identify other users of the micro-blogging service. Other users may also be added to the post without Bill providing explicit user-input to add them. For example, Bill may tag "Bob" in a photo that is in the post and Bob may be automatically added to the post. Upon receiving identifications of these other users from Bill's client device, the micro-blogging service may add the other user's to a list of post recipients. Thus, John's post 504 may appear in the @replied users' post streams. The new, @replied users may be enrolled as subscribed to the specific post so that the new users are informed or able to view all new activity on the post (e.g., comments, likes, content added by John, etc.) The new users may be subscribed to the particular post, but may not be subscribed to the post author.

In some examples, when an @replied user receives a post, the received post may indicate the user that shared the post with the @replied user. For example, the post may state "Susan reshared this post with you." A post can also display a history of sharing. For example, the post may state "Susan reshared this post from Jill who had reshared the post from Bob."

As another option, Bill may email the post by selecting the email interface element 536 and entering an individual's email address. In response, the post content may be emailed to the individual's email account. The recipient of the post content may not be subscribed to the post (as with an @reply where updates on the post content are viewed with the received email message). The email message, however, may include a link or other mechanism that enables the user to subscribe to the particular post.

The "Expand" option 544 may enable Bill to expand John's post 504 so that all content associated with the post 504 (e.g., all content that he submitted, all comments, etc.) may be viewed at a single time in an expanded form. The post may increase in size within the interface 500 or may appear as a separate "pop-up" box that is overlaid on the interface 500. In some examples, the post 504 displays all users that are subscribed to the post, and whether the users subscribed to the individual post, follow the post author, were recommend to the post, or were @replied to the post. In some examples, users can select additional features through the drop down interface element 544. Example features can include an ability to delete the post from the user's stream, ignore additional activity on the post so that the post does not jump to the top of the user's stream with every comment, subscribe to the author of the stream, and unsubscribe the author of the stream.

As illustrated, John's post may not be solely static text or multimedia content that was submitted by John for dissemination to other users. The users that received the post may be able to comment on the post, add content, tag people in pictures or videos, and add other users to the post. Thus, the post may also be referred to as an "activity" that originates with John as the author, but may grow in content as other users contribute content to the activity.

The messaging system interface 500 includes several tabs 508a-d for switching "views." Each view may include a different set of posts. For example, each view may apply a different filter to the overall set of posts that Bill has received. The "All Posts" tab 508a may display all posts that the micro-blogging service has provided to Bill's account (e.g., because he subscribed to the author or subscribed to the post, or the post was recommended for display to Bill). The "Subscribed User Posts" tab 508b may display posts for authors that Bill has subscribed to, but may not include a display of posts that were recommended for Bill. The "Recommended Posts" tab 508c may include a display of posts that the micro-blogging system recommended for Bill, but may not include posts for authors that Bill subscribed to. The "Posts Near Me" tab 508d may include a list of posts that were submitted by users near Bill, either users that Bill subscribes to or all users. For example, Bill may identify a home location or zip code in the settings of the messaging system, or Bill's location may be identified through a Global Positioning System or other location-identification service that is associated with a mobile device upon which Bill is viewing the messaging interface 500. If a place of posting for a post (e.g., John's post) is near Bill's location, John's post may appear in the "Posts Near Me" tab 508d. The "Posts Near Me" tab 508d may also be weighted by time so that only recent posts are displayed (e.g., so that the stream illustrates recent activity around Bill's location). The "Posts Near Me" tab 508d may identify locations of the recent posts as graphical interface elements overlaid on a map.

Figure 6:
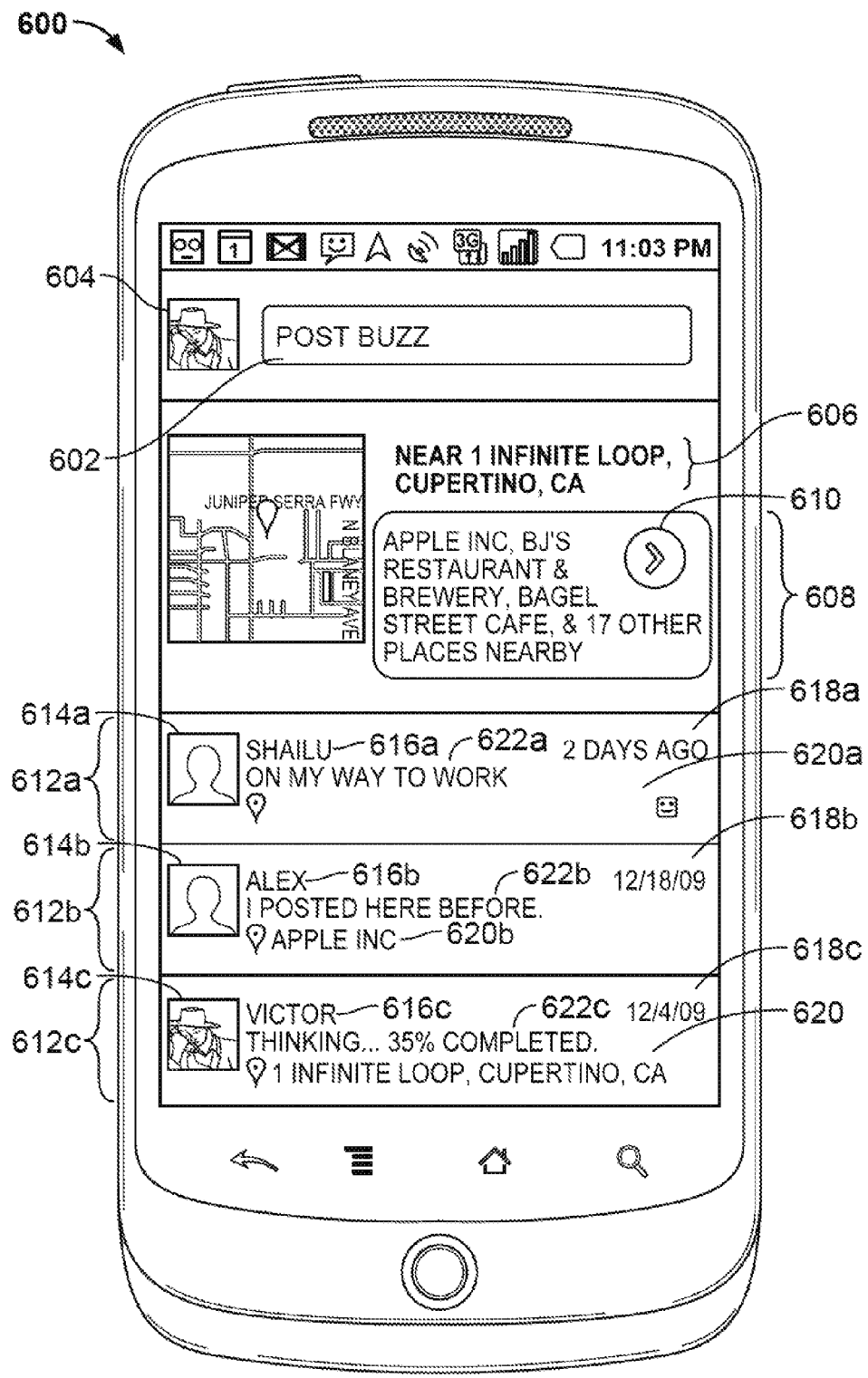
FIG. 6 is an illustration of a micro-blogging application invoked for display on a mobile telephone.

FIG. 6 is an illustration of a micro-blogging application invoked for display on a mobile telephone. The interface 600 can include a picture 604 of the user that is logged into the account, and an input box 602 for submitting posts that are associated with the user account. A present location 606 of the mobile computing device may be displayed in the interface 600. The present location may be identified by location-identification services (e.g., GPS, cellular identification, or Wi-Fi identification). The present location may be coordinates, an address, or a venue (e.g., a commercial business or public place). In some examples, the user can select his venue from a list of venues that are determined by a server system to be near an estimated geographical location of the mobile computing device.

The venues of interest box 608 can display a list of venues that may be near the mobile device's estimated geographical location. Selection of the expansion interface element 610 may invoke a display of detailed information for the venues of interest, or a display that enables selection of any of the venues of interest and subsequent display of detailed information (e.g., an address, map, hours of operation, website link). Selection of a venue may also cause the user to "check-in" to the selected venue.

The interface 600 may include a display of several posts 612a-c. Each post can include a picture of the poster 614a-c, a name of the poster 616a-c, a date of the post 618a-c, a place of posting 620a-c, and post content 622a-c. The post content may include a summary of original post content. Additional post content by the author, comments by other users, and other post content may be displayed in response to a selection of the post (e.g., by tapping on the post). In some examples, selection of the place of posting 620a-c invokes a display of the location of the place of posting (e.g., on a map). In some examples, the interface 600 for the application program may not be integrated with an email application (e.g., unlike interface 500).

Figure 7A:
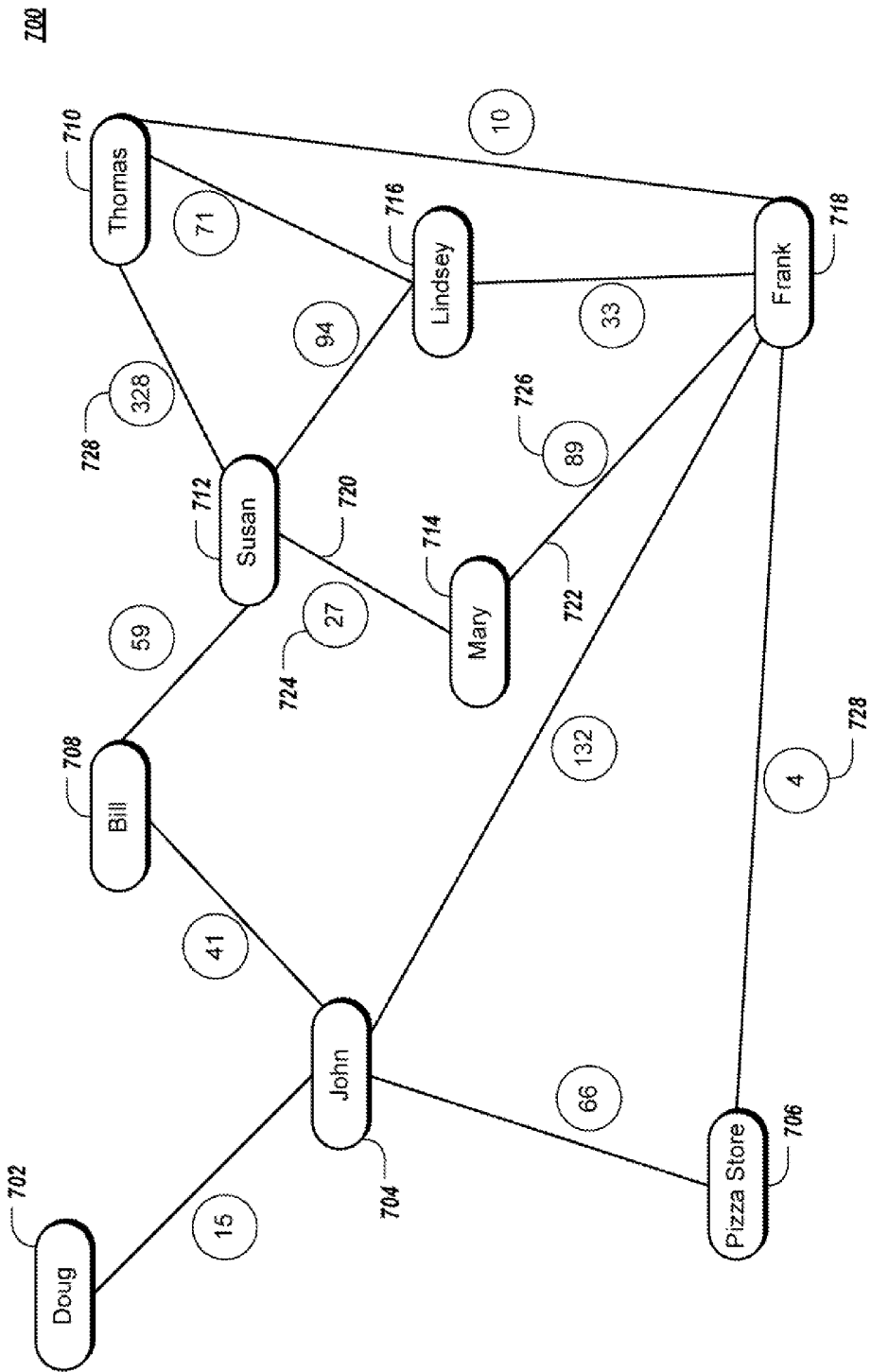
FIG. 7A is a schematic illustration of an example social network.
Figure 7B:
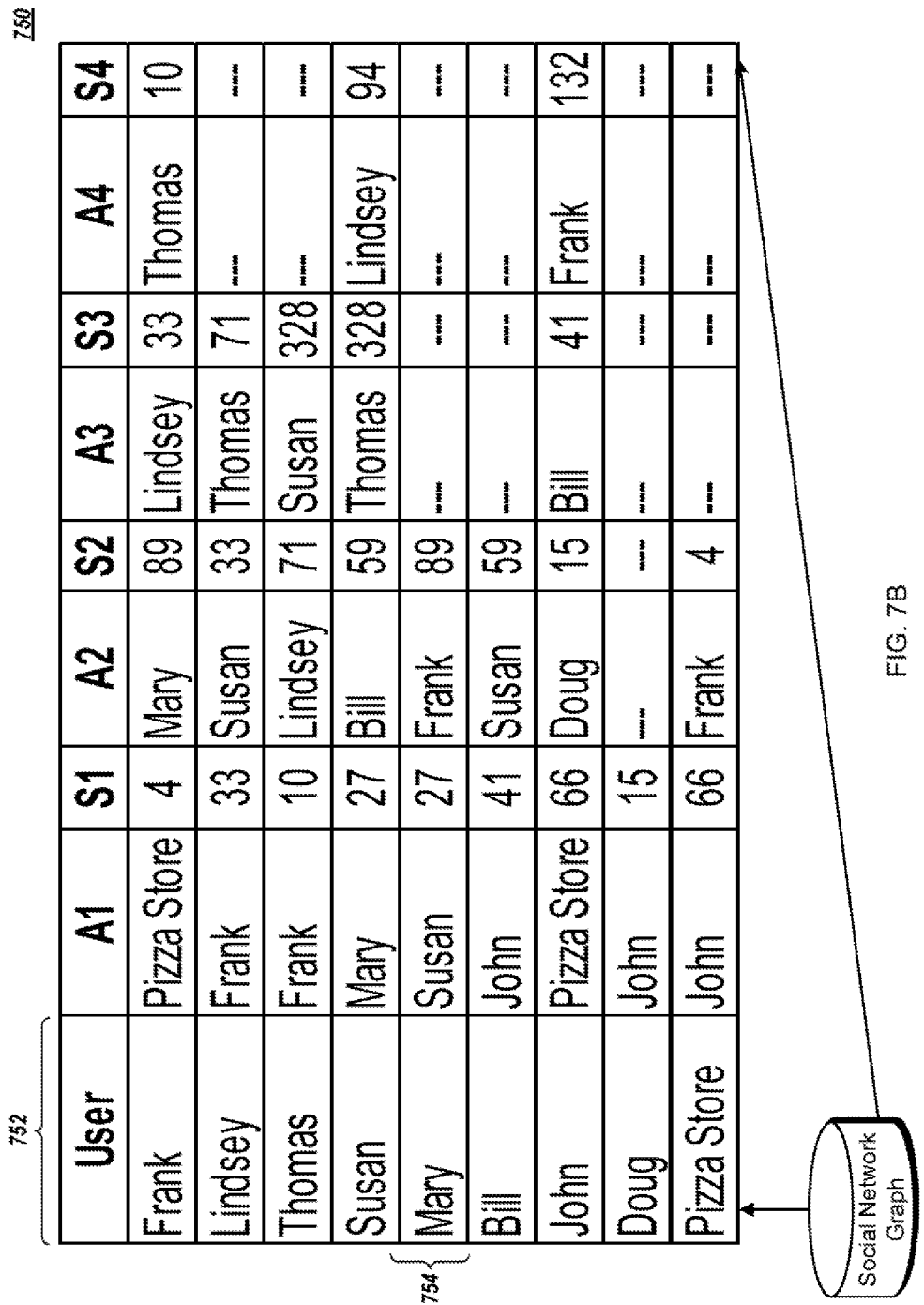
FIG. 7B illustrates an example data structure that represents a social graph.

An example social network graph is illustrated in FIGS. 7A-B. FIG. 7A illustrates a social network graph 700 as a schematic representation of users of a social network and their relationships between each other. Each of the nodes identifies a member of the social network and each edge between the nodes represents an acquaintance relationship between the members. As described herein, an acquaintanceship relationship is a direct relationship in a social graph between users of a social network, as opposed to an indirect relationship. A direct relationship between two users may be formed when a first of the two users requests to receive posts that are submitted by a second of the two users. Each relationship may be accompanied by a number that identifies a strength of the relationship.

As an illustration, node 714 ("Mary") is identified as in a direct relationship (e.g., directly related) to nodes 712 ("Susan") and 718 ("Frank"). Thus, Susan and Frank are identified as friends or acquaintances of Mary and the edges 722 and 720 represent acquaintance relationships. Conversely, node 714 ("Mary") is in an indirect relationship (e.g., indirectly related) to node 704 ("John") and node 702 ("Doug"). Mary is not connected to either of nodes 704 or 702 with a single acquaintanceship relationship.

An acquaintance relationship between two users of a social network, messaging service, or micro-blogging service can be formed by: (i) either of the users requesting to subscribe to posts that are authored by the other of the users, (ii) upon receiving a request to subscribe, the other of the users acknowledging the request, (iii) a user commenting on a post by the other of the users, (iv) one of the users being in an address book stored for the other of the users (e.g., Mary's messaging system may have an address book that is independent of Mary's subscriptions, but identifies individuals that Mary has emailed or has stored as contacts of interest), or any combination thereof. Thus, several mechanisms may exist for generating an acquaintance relationship between users.

A strength of an acquaintance relationship may depend on the mechanism for generating the acquaintance relationship or a subsequent frequency and type of contact between the users. For example, a relationship where both users subscribed to each other may be stronger than a relationship where only one of the users subscribes to the other user. A relationship where one of the users subscribes to the other user may be stronger than a relationship where the one user includes the other user in an address book of contacts, but does not subscribe to the other user. A relationship where a user includes an address of the user in a contact book, may be stronger than a relationship where a user once emailed another user but did not add that other user to his address book. A relationship where a user commented a single time on a post of another user, but did not subscribe to the other user, may be stronger than a relationship where the user emailed the other user a single time.

A strength of acquaintance relationship may depend on a frequency of contact between the users. For example, a frequency of contact can depend on how often a user emails another user, comments on the other user's posts, likes the other user's posts, or @replies to the other user's posts. The relationship may be stronger if both users interact with each other than if the interaction is only in one direction. The strength of contact may depend on how recent the contact was. For example, Bill commenting on Frank's posts 52 times three months ago may provide less of an impact on a strength of Bill and Frank's relationship than Bill commenting on Frank's posts 22 times in the last month. In social graph 700, the relationship 720 between Mary and Susan has a strength of 27 (item 724), and the relationship between Frank and Mary has a strength of 89 (item 726).

While the social graph 700 is illustrated schematically, a computer may store the graph 700 as a data structure. FIG. 7B illustrates, as table 750, an example data structure that represents a social graph. In this example table, each user 752 is associated with a row of the table. For example, Mary's row 754 illustrates that she is an acquaintance of Susan with a strength of 27, and an acquaintance of Frank with a score of 89.

Figure 8:
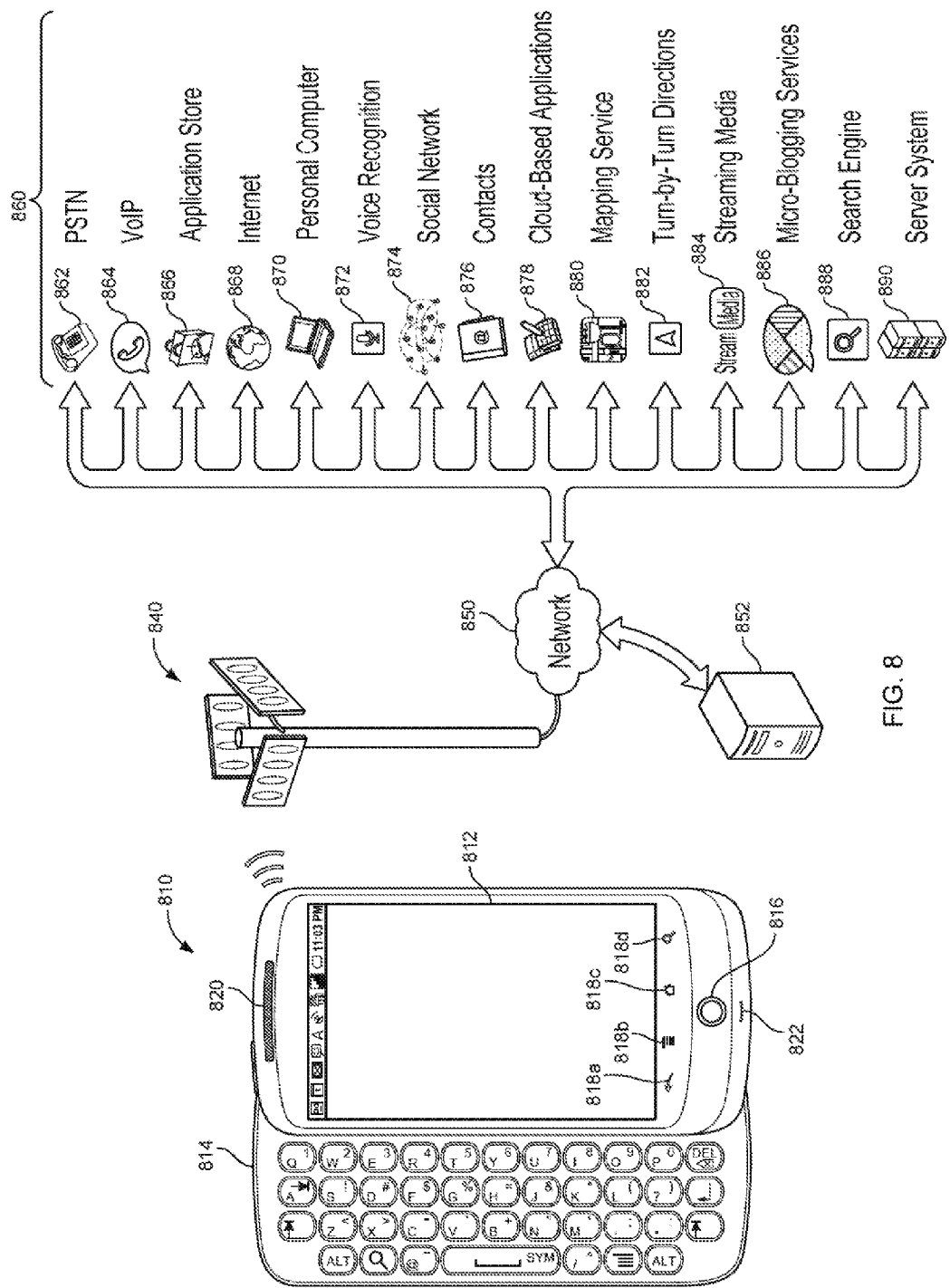
FIG. 8 is a conceptual diagram of a system that may be used to implement the systems and methods described in this document.

Referring now to FIG. 8, a conceptual diagram of a system that may be used to implement the systems and methods described in this document is illustrated. Mobile computing device 810 can wirelessly communicate with base station 840, which can provide the mobile computing device wireless access to numerous services 860 through a network 850.

In this illustration, the mobile computing device 810 is depicted as a handheld mobile telephone (e.g., a smartphone or an application telephone) that includes a touchscreen display device 812 for presenting content to a user of the mobile computing device 810. The mobile computing device 810 includes various input devices (e.g., keyboard 814 and touchscreen display device 812) for receiving user-input that influences the operation of the mobile computing device 810. In further implementations, the mobile computing device 810 may be a laptop computer, a tablet computer, a personal digital assistant, an embedded system (e.g., a car navigation system), a desktop computer, or a computerized workstation.

The mobile computing device 810 may include various visual, auditory, and tactile user-output mechanisms. An example visual output mechanism is display device 812, which can visually display video, graphics, images, and text that combine to provide a visible user interface. For example, the display device 812 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 812). Further, the mobile computing device 810 may include one or more speakers 820 that convert an electrical signal into sound, for example, music, an audible alert, or voice of an individual in a telephone call.

An example mechanism for receiving user-input includes keyboard 814, which may be a full qwerty keyboard or a traditional keypad that includes keys for the digits '0-9', '*', and '#.' The keyboard 814 receives input when a user physically contacts or depresses a keyboard key. User manipulation of a trackball 816 or interaction with a trackpad enables the user to supply directional and rate of rotation information to the mobile computing device 810 (e.g., to manipulate a position of a cursor on the display device 812).

The mobile computing device 810 may be able to determine a position of physical contact with the touchscreen display device 812 (e.g., a position of contact by a finger or a stylus). Using the touchscreen 812, various "virtual" input mechanisms may be produced, where a user interacts with a graphical user interface element depicted on the touchscreen 812 by contacting the graphical user interface element. An example of a "virtual" input mechanism is a "software keyboard," where a keyboard is displayed on the touchscreen and a user selects keys by pressing a region of the touchscreen 812 that corresponds to each key.

The mobile computing device 810 may include mechanical or touch sensitive buttons 818*a-d*. Additionally, the mobile computing device may include buttons for adjusting volume output by the one or more speakers 820, and a button for turning the mobile computing device on or off. A microphone 822 allows the mobile computing device 810 to convert audible sounds into an electrical signal that may be digitally encoded and stored in computer-readable memory, or transmitted to another computing device. The mobile computing device 810 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 8/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 810 may present a graphical user interface with the touchscreen 812. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 804. User-selection of the button may invoke the pre-defined action.

In some examples, the operating system provides a "desktop" user interface that is displayed upon turning on the mobile computing device 810, activating the mobile computing device 810 from a sleep state, upon "unlocking" the mobile computing device 810, or upon receiving user-selection of the "home" button 818*c*. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 810 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 812 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 810 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 810 may include other application modules and hardware. A call handling unit may receive an indication of an incoming telephone call and provide a user capabilities to answer the incoming telephone call. A media player may allow a user to listen to music or play movies that are stored in local memory of the mobile computing device 810. The mobile telephone 810 may include a digital camera sensor, and corresponding image and video capture and editing software. An internet browser may enable the user to view content from a web page by typing in an addresses corresponding to the web page or selecting a link to the web page.

The mobile computing device 810 may include an antenna to wirelessly communicate information with the base station 840. The base station 840 may be one of many base stations in a collection of base stations (e.g., a mobile telephone cellular network) that enables the mobile computing device 810 to maintain communication with a network 850 as the mobile computing device is geographically moved. The computing device 810 may alternatively or additionally communicate with the network 850 through a Wi-Fi router or a wired connection (e.g., Ethernet, USB, or FIREWIRE). The computing device 810 may also wirelessly communicate with other computing devices using BLUETOOTH protocols, or may employ an ad-hoc wireless network.

A service provider that operates the network of base stations may connect the mobile computing device 810 to the network 850 to enable communication between the mobile computing device 810 and other computerized devices that provide services 860. Although the services 860 may be provided over different networks (e.g., the service provider's internal network, the Public Switched Telephone Network, and the Internet), network 850 is illustrated as a single network. The service provider may operate a server system 852 that routes information packets and voice data between the mobile computing device 810 and computing devices associated with the services 860.

The network 850 may connect the mobile computing device 810 to the Public Switched Telephone Network (PSTN) 862 in order to establish voice or fax communication between the mobile computing device 810 and another computing device. For example, the service provider server system 852 may receive an indication from the PSTN 862 of an incoming call for the mobile computing device 810. Conversely, the mobile computing device 810 may send a communication to the service provider server system 852 initiating a telephone call with a telephone number that is associated with a device accessible through the PSTN 862.

The network 850 may connect the mobile computing device 810 with a Voice over Internet Protocol (VoIP) service 864 that routes voice communications over an IP network, as opposed to the PSTN. For example, a user of the mobile computing device 810 may invoke a VoIP application and initiate a call using the program. The service provider server system 852 may forward voice data from the call to a VoIP service, which may route the call over the internet to a corresponding computing device, potentially using the PSTN for a final leg of the connection.

An application store 866 may provide a user of the mobile computing device 810 the ability to browse a list of remotely stored application programs that the user may download over the network 850 and install on the mobile computing device 810. The application store 866 may serve as a repository of applications developed by third-party application developers. An application program that is installed on the mobile computing device 810 may be able to communicate over the network 850 with server systems that are designated for the application program. For example, a VoIP application program may be downloaded from the Application Store 866, enabling the user to communicate with the VoIP service 864.

The mobile computing device 810 may access content on the internet 868 through network 850. For example, a user of the mobile computing device 810 may invoke a web browser application that requests data from remote computing devices that are accessible at designated universal resource locations. In various examples, some of the services 860 are accessible over the internet.

The mobile computing device may communicate with a personal computer 870. For example, the personal computer 870 may be the home computer for a user of the mobile computing device 810. Thus, the user may be able to stream media from his personal computer 870. The user may also view the file structure of his personal computer 870, and transmit selected documents between the computerized devices.

A voice recognition service 872 may receive voice communication data recorded with the mobile computing device's microphone 822, and translate the voice communication into corresponding textual data. In some examples, the translated text is provided to a search engine as a web query, and responsive search engine search results are transmitted to the mobile computing device 810.

The mobile computing device 810 may communicate with a social network 874. The social network may include numerous members, some of which have agreed to be related as acquaintances (e.g., forming an acquaintanceship relationship). Application programs on the mobile computing device 810 may access the social network 874 to retrieve information based on the acquaintances of the user of the mobile computing device. For example, an "address book" application program may retrieve telephone numbers for the user's acquaintances. In various examples, content may be delivered to the mobile computing device 810 based on social network distances from the user to other members. For example, advertisement and news article content may be selected for the user based on a level of interaction with such content by members that are "close" to the user (e.g., members that are "friends" or "friends of friends").

The mobile computing device 810 may access a personal set of contacts 876 through network 850. Each contact may identify an individual and include information about that individual (e.g., a phone number, an email address, and a birthday). Because the set of contacts is hosted remotely to the mobile computing device 810, the user may access and maintain the contacts 876 across several devices as a common set of contacts.

The mobile computing device 810 may access cloud-based application programs 878. Cloud-computing provides application programs (e.g., a word processor or an email program) that are hosted remotely from the mobile computing device 810, and may be accessed by the device 810 using a web browser or a dedicated program. Example cloud-based application programs include GOOGLE DOCS word processor and spreadsheet service, GOOGLE GMAIL webmail service, and PICASA picture manager.

Mapping service 880 can provide the mobile computing device 810 with street maps, route planning information, and satellite images. An example mapping service is GOOGLE MAPS. The mapping service 880 may also receive queries and return location-specific results. For example, the mobile computing device 810 may send an estimated location of the mobile computing device and a user-entered query for "pizza places" to the mapping service 880. The mapping service 880 may return a street map with "markers" superimposed on the map that identify geographical locations of nearby "pizza places."

Turn-by-turn service 882 may provide the mobile computing device 810 with turn-by-turn directions to a user-supplied destination. For example, the turn-by-turn service 882 may stream to device 810 a street-level view of an estimated location of the device, along with data for providing audio commands and superimposing arrows that direct a user of the device 810 to the destination.

Various forms of streaming media 884 may be requested by the mobile computing device 810. For example, computing device 810 may request a stream for a pre-recorded video file, a live television program, or a live radio program. Example services that provide streaming media include YOUTUBE and PANDORA.

A micro-blogging service 886 may receive from the mobile computing device 810 a user-input post that does not identify recipients of the post. The micro-blogging service 886 may disseminate the post to other members of the micro-blogging service 886 that agreed to subscribe to the user.

A search engine 888 may receive user-entered textual or verbal queries from the mobile computing device 810, determine a set of internet-accessible documents that are responsive to the query, and provide to the device 810 information to display a list of search results for the responsive documents. In examples where a verbal query is received, the voice recognition service 872 may translate the received audio into a textual query that is sent to the search engine.

These and other services may be implemented in a server system 890. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 9:
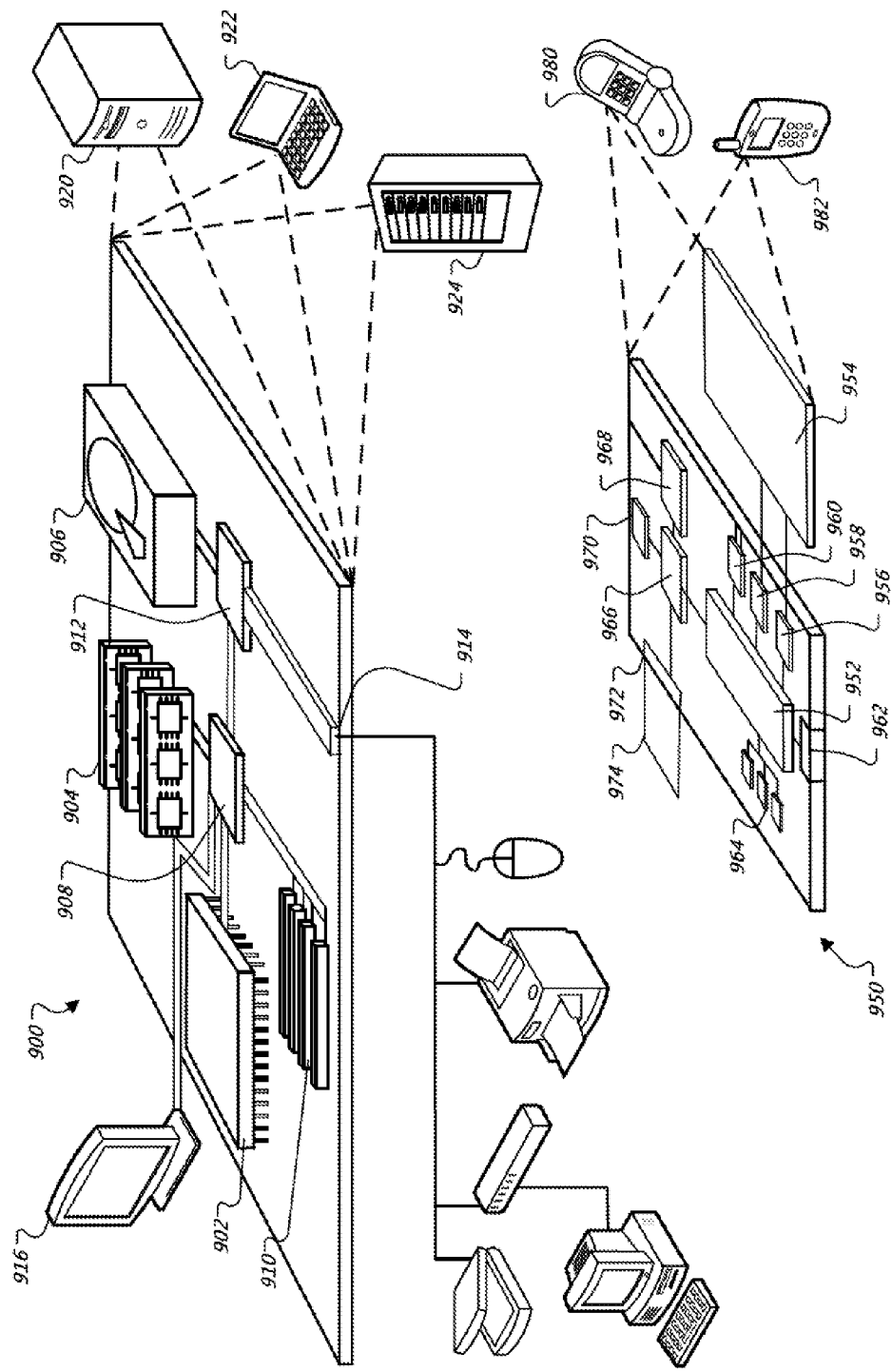
FIG. 9 is a block diagram of computing devices that may be used to implement the systems and methods described in this document, as either a client or as a server or plurality of servers.

FIG. 9 is a block diagram of computing devices 900, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. Additionally computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
  identifying, by a server system, a plurality of posts that were submitted to a messaging system from a plurality of users with which a first user of the messaging system has an acquaintanceship relationship;

analyzing, by the server system, content from a body of each post in the plurality to determine a group of the posts that each reference a common topic, the common topic referenced by a first subset of the content of each post in the group;

scoring the content of each respective post in the plurality of posts with respect to relevancy based on a predetermined number of characters in the respective post, a predetermined type of multimedia content in the respective post, a predetermined number of comments afforded the respective post by users of the messaging system, or a predetermined number of comments of a certain type afforded the first post by users of the messaging system;

identifying a first post in the group of posts based on the score for relevancy as determined by the scoring, wherein the first post references the common topic; and providing information, by the server system and for receipt by a computing device, so as to cause the computing device to display to the first user (i) the first post and (ii) in place of an individual display for each post in the group other than the first post, an aggregate post that comprises a presentation of a primary entity for the aggregate post, wherein the primary entity for the aggregate post has been determined by the system to be referred to by the common topic.

2. The computer-implemented method of claim 1, wherein the first user of the messaging system does not have an acquaintanceship relationship with the primary entity.

3. The computer-implemented method of claim 1, wherein the display of the aggregate post includes a graphical interface element that, when selected by the first user, causes the computing device to display a web page that is hosted by the messaging system for the primary entity and that displays content that the primary entity designated for display on the web page.

4. The computer-implemented method of claim 1, wherein the display of the aggregate post includes an image that the primary entity designated, using settings of the messaging system, as a primary image for the primary entity's account.

5. The computer-implemented method of claim 4, wherein:
the display of the aggregate post is provided in a displayed feed of the plurality of posts;
remaining posts in the plurality that are not in the group of posts are displayed as individual posts in the feed, each display of a particular remaining post of the remaining posts including an image that a user of the messaging system that authored the particular remaining post designated as a primary image for the user's account; and
the image that the primary entity designated as the primary image has a displayed position within the aggregate post that is the same as a displayed position within each particular remaining post of the image that is designated as the primary image for the particular remaining post.

6. The computer-implemented method of claim 4, wherein:
the display of the aggregate post is provided in a displayed feed of the plurality of posts;
remaining posts in the plurality that are not in the group of posts are displayed as individual posts in the feed, each display of a particular remaining post of the remaining posts including an image that a user of the messaging system that authored the particular remaining post designated as a primary image for the user's account; and
the image that the primary entity designated as the primary image has a size that is a same as a size of each image that is designated as the primary image for each particular remaining post.

7. The computer-implemented method of claim 1, wherein the acquaintanceship relationship was formed between the first user and each particular user in the plurality in response to a user-provided request by the first user to form the acquaintanceship relationship with the particular user, and a user-provided acknowledgment by the particular user that the acquaintanceship relationship should be formed.

8. The computer-implemented method of claim 1, wherein the group of posts is determined based on each of the posts in the group including a same Uniform Resource Identifier (URI).

9. The computer-implemented method of claim 1, wherein the group of posts is determined based on a subset of the posts in the group including a first Uniform Resource Locator (URL), and a remaining subset of the posts in the group including another URL that has been determined to cause a redirect to the first URL.

10. The computer-implemented method of claim 1, wherein the group of posts is determined based on a subset of the posts in the group including predetermined text, and a remaining subset of the posts in the group including a Uniform Resource Locator (URL) that identifies a resource that includes the predetermined text, wherein each of the remaining subset of posts do not include the predetermined text.

11. The computer-implemented method of claim 1, wherein the feed does not include individual displays for each of the posts in the group.

12. The computer-implemented method of claim 1, wherein the display of the aggregate post includes graphical user interface elements that visually indicate the users that submitted the posts in the group.

13. The computer-implemented method of claim 1, wherein the group of posts is determined based on the posts in the group including a first Uniform Resource Locator (URL), and wherein the display of the aggregate post includes content that was retrieved from a document identified by the first URL and that was not included in any of the posts in the group.

14. The computer-implemented method of claim 1, further comprising performing, on each particular post in the group, sentiment analysis using user-provided content in the particular post to identify an attitude of a user that submitted the particular post towards the common topic, wherein the display of the aggregate post includes a visual identification of the attitude for each user that submitted each particular post or a summary of the attitudes of each user that submitted each particular post.

15. The computer-implemented method of claim 1, wherein the group of posts is determined based on each particular post in the group being submitted while an author of the particular post had designated a particular venue as a current geographical location.

16. The computer-implemented method of claim 15, wherein:
the particular user provided user input to designate the particular venue as the current geographical location before submitting the post; and
the particular user submitted another post before the particular post without again providing user input to designate the particular venue as the current geographical location.

17. The computer-implemented method of claim 1, wherein the common topic was determined, without user intervention, as a topic for which aggregate posts may be generated based, at least in part, on the common topic being selected, without user intervention, as a frequent term in search queries that are provided to a search engine system.

18. A computer-implemented system comprising:
- a computer-implemented post distributor that is programmed to identify, for a first user, a plurality of posts that were submitted to a messaging system from a plurality of users with which the first user has an acquaintanceship relationship;
- a computer-implemented common topic extractor that is programmed to analyze content from a body of each post in the plurality to determine a group of the posts that each reference a common topic, the common topic referenced by a first subset of the content of each post in the group;
- a computer-implemented post generator that is programmed to generate an aggregate post that is (i) based on the common topic and (ii) that comprises a presentation of a primary entity for the aggregate post wherein the primary entity for the aggregate post has been determined by the system to be referred to by the common topic; and
- a computer-implemented post communicator that is programmed to provide information that causes a visual display to the first user on a computing device of the aggregate post in place of an individual display for each post in the group;
- wherein (i) the common topic extractor determines that a first post in the plurality is excluded from the group of posts, (ii) the first post references the common topic, and (iii) the first post has a determined relevance that exceeds a predetermined relevance score based on a predetermined number of characters in the first post, a predetermined type of multimedia content in the first post, a predetermined number of comments afforded the first post by users of the computer-implemented system, or a predetermined number of comments of a certain type afforded the first post by users of the computer-implemented system, thereby causing the post communicator to provide information that causes a concurrent visual display of the first post and the aggregate post.

19. The system of claim 18, wherein the information further causes a concurrent visual display of the aggregate post and other posts in the plurality that are not included in the first group.

* * * * *